(12) United States Patent
Zhu et al.

(10) Patent No.: US 11,483,058 B2
(45) Date of Patent: Oct. 25, 2022

(54) COMMUNICATION METHOD, COMMUNICATIONS NODE, AND SYSTEM

(71) Applicant: HUAWEI TECHNOLOGIES CO., LTD., Guangdong (CN)

(72) Inventors: Yuanping Zhu, Shanghai (CN); Mingzeng Dai, Shanghai (CN); Jing Liu, Shanghai (CN)

(73) Assignee: HUAWEI TECHNOLOGIES CO., LTD., Guangdong (CN)

( * ) Notice: Subject to any disclaimer, the term of this patent is extended or adjusted under 35 U.S.C. 154(b) by 92 days.

(21) Appl. No.: 16/883,176

(22) Filed: May 26, 2020

(65) Prior Publication Data

US 2020/0287615 A1    Sep. 10, 2020

Related U.S. Application Data

(63) Continuation of application No. PCT/CN2018/117607, filed on Nov. 27, 2018.

(30) Foreign Application Priority Data

Nov. 27, 2017  (CN) .......................... 201711206454.4

(51) Int. Cl.
*H04B 7/155*  (2006.01)
*H04L 69/323*  (2022.01)
*H04L 69/324*  (2022.01)

(52) U.S. Cl.
CPC ........ *H04B 7/15507* (2013.01); *H04L 69/323* (2013.01); *H04L 69/324* (2013.01)

(58) Field of Classification Search
CPC .. H04B 7/15507; H04L 69/323; H04L 69/324
See application file for complete search history.

(56) References Cited

U.S. PATENT DOCUMENTS

2002/0065093 A1\* 5/2002 Yi ........................... H04L 29/06
                                                                      455/452.2
2010/0272006 A1  10/2010 Bertrand et al.
(Continued)

FOREIGN PATENT DOCUMENTS

CN    101151872 A    3/2008
CN    101292556 A    10/2008
(Continued)

OTHER PUBLICATIONS

Notice of Allowance in Chinese Application No. 201711206454.4 dated Jun. 16, 2021, 4 pages.
(Continued)

*Primary Examiner* — Walli Z Butt
*Assistant Examiner* — Ryan C Kavleski

(57) ABSTRACT

A relay communication method, includes: a relay node receives data from a second network node; the relay node performs first-part processing and second-part processing on the data; and the relay node sends to a third network node, data obtained after the first-part processing and the second-part processing. In one non-limiting example, thy first-part processing includes at least one of: physical layer function processing, media access control layer function processing, and adaptation function processing. In another non-limiting example, the second-part processing includes at least one of simplified radio link control layer function processing, adaptation function processing, media access control layer function processing, and physical layer function processing.

18 Claims, 12 Drawing Sheets

(56) References Cited

U.S. PATENT DOCUMENTS

| | | | |
|---|---|---|---|
| 2012/0039245 A1* | 2/2012 | Wang | H04B 7/155 370/315 |
| 2012/0224525 A1* | 9/2012 | Wang | H04W 80/04 370/328 |
| 2016/0323845 A1 | 11/2016 | Kim et al. | |
| 2020/0187152 A1* | 6/2020 | Karampatsis | H04W 4/06 |

FOREIGN PATENT DOCUMENTS

| | | |
|---|---|---|
| CN | 101384020 A | 3/2009 |
| CN | 101848489 A | 9/2010 |
| CN | 102098725 A | 6/2011 |
| CN | 102448053 A | 5/2012 |
| CN | 102369784 B | 3/2014 |
| CN | 104125652 A | 10/2014 |
| CN | 104717717 A | 6/2015 |
| CN | 102763346 B | 9/2015 |
| CN | 102449944 B | 11/2015 |
| CN | 106664516 A | 5/2017 |
| CN | 107295459 A | 10/2017 |
| EP | 3668266 A1 | 6/2020 |
| WO | 2014128690 A2 | 8/2014 |
| WO | 2016163808 A1 | 10/2016 |

OTHER PUBLICATIONS

PCT International Search Report, Application No. PCT/CN2018/117607 dated Nov. 27, 2017, 10 pages.

Kazuaki Takeda, New Radio (NR) Access Technology. 3GPP TSG RAN meeting #77, Sapporo, Japan, Sep. 11-14, 2017, RP-171783, 83 pages.

Zhang Shuang, The Performance Research of LTE-A Cellular Network Based on Relay and Device-to-Device Technology. Harbin Institute of Technology, 2017, 1 page.

Office Action in Chinese Application No. 201711206454.4 dated Nov. 4, 2020.

Coolpad, Discussion on Radio Bearer Mapping for L2 Relay UE. 3GPP TSG RAN WG2#97bis, Spokane, USA, 3 Apr. 7, 2017, R2-1703371, 4 pages.

Ericsson, User plane architecture. 3GPP TSG-RAN WG2 #96, Reno, Nevada, USA, 14th Nov. 18, 2016, R2-168214, 5 pages.

Partial European Search Report in European Application No. EP 18 88 1593 dated Nov. 20, 2020.

* cited by examiner

COMMUNICATION METHOD, COMMUNICATIONS NODE, AND SYSTEM

CROSS-REFERENCE TO RELATED APPLICATIONS

This application is a continuation of International Application No. PCT/CN2018/117607, filed on Nov. 27, 2018, which claims priority to Chinese Patent Application No. 201711206454.4, filed on Nov. 27, 2017. The disclosures of the aforementioned applications are hereby incorporated by reference in their entireties.

TECHNICAL FIELD

The present invention relates to the field of communications technologies, and in particular, to a communication method, a communications node, and a system.

BACKGROUND

The 3rd generation partnership project (3GPP) defines a relay transmission solution of a radio access network. According to a definition in 3GPP Release 10 (R10), a radio relay communications system 100 shown in FIG. 1 includes user equipment (UE), a relay node (RN), a donor eNodeB (DeNB), and a serving gateway (SGW) and/or a packet data network gateway (PGW). A protocol stack of the UE includes a physical layer (PHY), a media access control layer (MAC), a radio link control layer (RLC), a packet data convergence protocol layer (PDCP), an internet protocol layer (IP), and a transmission control protocol layer (TCP) and/or a user datagram protocol layer (UDP), to support data transmission required by an upper-layer application. In the system 100, the RN almost has a complete base station capability, and a protocol stack configured on an interface between the RN and the DeNB includes: PHY layer, MAC layer, RLC layer, PDCP layer, IP layer, UDP layer, and a GPRS tunneling protocol-user plane (GTP-U). A protocol stack configured on an interface between the RN and the UE includes PHY, MAC, RLC, and PDCP. In the system 100, the DeNB is a base station that provides a service to the RN, and provides a proxy (e.g., S1/X2 proxy) of a related function to the RN on an S1 interface and an X2 interface. The protocol stack configured on the interface between the DeNB and the RN includes: PHY, MAC, RLC, PDCP, IP, UDP and GTP-U. A protocol stack configured on an interface between the DeNB and a core network gateway SGW/PGW includes L1, L2, IP, UDP, and GTP-U, where L2 is a link layer, and L1 is a physical layer. The SGW/PGW has a protocol stack peering to that of the DeNB, and the protocol stack includes: L1, L2, IP, UDP, GTP-U, and an IP layer that is peering to that of the UE. In the system 100, the UE performs communication interaction with the RN through a Uu interface, the RN performs communication interaction with the DeNB through a Un interface, and the DeNB performs communication interaction with the SGW/PGW through an S1 interface. Specifically, the UE accesses the RN through the Uu interface, an evolved packet system (EPS) bearer is established between the UE and the PGW, a GTP tunnel corresponding to the EPS bearer is correspondingly established on the S1 interface between the DeNB and the SGW/PGW, a GTP tunnel is also established on the Un interface between the RN and the DeNB, and there is a correspondence between the GTP tunnel established on the Un interface and the GTP tunnel established on the S1 interface. Therefore, a correct next-hop node can be found in each transmission section by using a bearer identifier and/or a tunnel identifier of a data packet. The system 100 defined in 3GPP R10 currently supports only a single-hop relay scenario. When a downlink data packet is sent from the DeNB to the RN, the downlink data packet needs to be decapsulated by the protocol stack on the Un interface between the DeNB and the RN (where protocol stack sublayers participating in processing include: PHY, MAC, RLC, PDCP, IP, UDP, and GTP-U), then, is processed and encapsulated again at the layers of the air interface protocol stack on the Uu interface (where protocol stack sublayers participating in processing include PHY, MAC, RLC, and PDCP), and then is sent by the RN to the UE. If this relay transmission manner is applied to a multi-hop relay scenario, an end-to-end transmission latency of the data packet is relatively large.

SUMMARY

In a new-generation communications system, if an architecture of a relay communications system in 3GPP R10 is still used, it needs to take a relatively large amount of time to process a data packet in a relay node, and it is difficult to meet a strict requirement of the new-generation communications system for a low latency. In addition, an existing hybrid automatic repeat request (HARQ) mechanism at a MAC layer of an RN node can already ensure reliability of transmitting the data packet. In view of this, this application implements a new relay transmission solution, to simplify processing of an RN node on a data packet, reduce a processing latency of the data packet in an intermediate node, and provide an end-to-end transmission guarantee of an access network side. According to a first aspect, this application provides a communication method applicable to a relay communications system. For example, the following mainly describes the communication method from a perspective of a relay node in the relay communications system. The method includes: receiving, by a first network node, data from a second network node; performing, in the first network node, first-part processing and second-part processing on the received data; and sending, by the first network node, processed data to a third network node, where the first-part processing is at least one of the following: physical layer function processing, media access control layer function processing, and adaptation function processing; the second-part processing is at least one of the following: simplified radio link control (S-RLC) layer function processing, adaptation function processing, media access control layer function processing, and physical layer function processing; and the first network node is a relay node in the relay communications system. By implementing this solution, processing of the relay node on the data can be simplified, and a processing time of the data in the relay node is reduced. Therefore, an end-to-end latency of data transmission in a communications network including the first network node, the second network node, and the third network node is reduced.

According to a first optional implementation of the first aspect, the second network node is a second relay node or a donor base station, the data from the second network node is downlink data, and the third network node is a terminal device; the first-part processing and the second-part processing are sequentially performed on the downlink data in the first network node; and the first-part processing is: the physical layer function processing, the media access control layer function processing, and the adaptation function processing; and the second-part processing is: the simplified radio link control layer function processing, the media access control layer function processing, and the physical layer function processing. By implementing this solution, processing of the relay node on the downlink data is simplified, and a processing time of the downlink-transmitted data in the relay node is reduced. Therefore, an end-to-end latency of downlink data transmission in the communications network including the first network node, the second network node, and the third network node is reduced. The downlink data that is received by the first network node or downlink data that is sent to the terminal device after being processed by the first network node may include at least one of the following information related to an adaptation function: information about an identifier of the terminal device, information about an identifier of a quality of service flow (QoS flow), information about an identifier of a protocol data unit session, information about an identifier of a relay node that serves the terminal device, information about an identifier of a radio bearer of the terminal device, and information about an identifier of a logical channel of the terminal device.

According to a second optional implementation of the first aspect, the data received by the first network node is downlink data from the second network node, the second network node is a third relay node or a donor base station, the third network node is a fourth relay node, and the downlink data is sent to a terminal device by using the third network node; the first-part processing and the second-part processing are sequentially performed on the downlink data in the first network node; and the first-part processing is: the physical layer function processing, the media access control layer function processing, and the adaptation function processing; and the second-part processing is: the simplified radio link control layer function processing, the adaptation function processing, the media access control layer function processing, and the physical layer function processing. The downlink data that is received by the first network node or downlink data that is sent to a next node after being processed by the first network node may include at least one of the following information related to an adaptation function: information about an identifier of the fourth relay node, information about an identifier of the terminal device; information about an identifier of a QoS flow, information about an identifier of a protocol data unit session, information about an identifier of a relay node that serves the terminal device, information about an identifier of a radio bearer of the terminal device, and information about an identifier of a logical channel of the terminal device.

According to the first optional implementation and/or the second optional implementation of the first aspect, the information about the identifier of the terminal device and/or the information about the identifier of the fourth relay node may be used for routing selection during the downlink data transmission, so that an intermediate node in a transmission path obtains a correct next-hop node for the downlink data that needs to be transmitted. The transmission path in this embodiment of this application may be understood as a transmission path of a data packet. For example, when the data packet is transmitted through a link DgNB-RN 2-RN 1-UE, the transmission path may be a data transmission path between any two endpoints in the link.

According to the first optional implementation and the second optional implementation of the first aspect, each of the information about the identifier of the QoS flow, the information about the identifier of the protocol data unit session, the information about the identifier of the radio bearer of the terminal device, and the information about the identifier of the logical channel of the terminal device that are in the information related to the adaptation function can be used to provide, in a transmission process, a required QoS guarantee to a service to which the downlink data belongs. For example, there may be a correspondence between the logical channel of the terminal device and the radio bearer of the terminal device, and the radio bearer usually has a QoS guarantee of a corresponding granularity. In this case, when the downlink data carries the information about the identifier of the logical channel of the terminal device or the information about the identifier of the radio bearer corresponding to the logical channel, a QoS requirement corresponding to the service to which the downlink data belongs is also indicated. Different protocol data unit sessions usually have different radio bearers and different QoS flows. Similarly, the different protocol data unit sessions also have corresponding QoS requirements based on the different radio bearers. Similar to the radio bearer, the QoS flow usually has a function of indicating a QoS guarantee of a specific granularity in the data transmission process. When the downlink data carries the information about the identifier of the QoS flow, the QoS requirement of the service to which the downlink data belongs is also indicated. In this way, a transmission node can transmit this data packet based on the QoS requirement corresponding to the QoS flow ID.

According to a third optional implementation of the first aspect, the data received by the first network node from the second network node is data in an uplink transmission direction, the second network node is a terminal device, and the third network node is a fifth relay node or a donor base station; the first-part processing and the second-part processing are sequentially performed on the uplink data in the first network node; and the first-part processing is: the physical layer function processing and the media access control layer function processing; and the second-part processing is: the simplified radio link control layer function processing, the adaptation function processing, the media access control layer function processing, and the physical layer function processing. By implementing this solution, processing of the relay node on the uplink data can be simplified, and a processing time of the uplink-transmitted data in the relay node is reduced. Therefore, an end-to-end latency of uplink data transmission in the communications network including the first network node, the second network node, and the third network node is reduced. Optionally, the uplink data that is received by the first network node or uplink data that is sent out after being processed by the first network node may include at least one of the following information related to an adaptation function: information about an identifier of the terminal device, information about an identifier of the fifth relay node, information about an identifier of the donor base station, information about an identifier of a QoS flow, information about an identifier of a protocol data unit session, information about an identifier of a radio bearer of the terminal device, and information about an identifier of a logical channel of the terminal device.

According to a fourth optional implementation of the first aspect, the data received by the first network node from the second network node is uplink data, the second network node is a sixth relay node, and the third network node is a seventh relay node or a donor base station; the first-part processing and the second-part processing are sequentially performed on the uplink data in the first network node; and the first-part processing is: the physical layer function processing, the media access control layer function processing, and the adaptation function processing; the second-part processing is: the simplified radio link control layer function processing, the adaptation function processing, the media access control layer function processing, and the physical layer function processing; and the first network node is a relay node (which is numbered as "a first relay node" for convenience of description only). By implementing this solution, processing of the relay node on the uplink data can be simplified, and a processing time of the uplink data in the relay node is reduced. Therefore, an end-to-end latency of uplink data transmission in the communications network including the first network node, the second network node, and the third network node is further reduced. The uplink data that is received by the first network node or uplink data that is obtained after being processed by the first network node may include at least one of the following information related to the adaptation function: information about an identifier of the terminal device, information about an identifier of the seventh relay node, information about an identifier of the donor base station, information about an identifier of a QoS flow, information about an identifier of a protocol data unit session, information about an identifier of a radio bearer of the terminal device, and information about an identifier of a logical channel of the terminal device.

According to the third optional implementation and the fourth optional implementation of the first aspect, the information about the identifier of the terminal device, the information about the identifier of the fifth relay node, the information about the identifier of the seventh relay node, and the information about the identifier of the donor base station may be used for a routing selection process during the uplink data transmission, so that an intermediate node in a transmission path obtains a correct next-hop node for the uplink data that needs to be transmitted.

According to the third optional implementation and the fourth optional implementation of the first aspect, each of the information about the identifier of the QoS flow, the information about the identifier of the protocol data unit session, the information about the identifier of the radio bearer of the terminal device, and the information about the identifier of the logical channel of the terminal device can be used to provide, in a transmission process, a required QoS guarantee to the data transmission. For example, there may be a correspondence between the logical channel of the terminal device and the radio bearer of the terminal device, and the radio bearer usually has a QoS guarantee of a corresponding granularity. In this case, when the uplink data carries the information about the identifier of the logical channel of the terminal device or the information about the identifier of the radio bearer corresponding to the logical channel, a QoS requirement corresponding to a service to which the uplink data belongs is also indicated. Different protocol data unit sessions usually have different radio bearers and different QoS flows. Similarly, the different protocol data unit sessions also have corresponding QoS requirements based on the different radio bearers. Similar to the radio bearer, the QoS flow usually has a function of indicating a QoS guarantee of a specific granularity in the data transmission process. When the uplink data carries the information about the identifier of the QoS flow, the QoS requirement of the service to which the uplink data belongs is also indicated. In this way, a transmission node can transmit this data packet based on the QoS requirement corresponding to the QoS flow ID.

With reference to any one of the foregoing implementations, according to a fifth optional implementation of the first aspect, the simplified radio link control layer function processing performed in the relay node includes: performing segmentation on a received radio link control layer protocol data unit, where obtained segments correspond to new radio link control layer protocol data units. In this way, the relay node has a function of segmenting the radio link control layer protocol data unit, so that the relay node can flexibly perform uplink/downlink data transmission. This improves system transmission efficiency and flexibility.

With reference to any one of the foregoing implementations, according to a sixth optional implementation of the first aspect, the first network node is a first relay node, and the simplified radio link control layer function processing performed in the relay node includes performing at least one or more of the following: skipping retransmitting a radio link control layer protocol data unit that is not correctly sent out; skipping feeding back a receiving state for a radio link control layer protocol data unit that is not correctly received; and sending a received report about a transmission state of a radio link control layer service data unit to a data transmit end, where the relay node does not parse content of the report about the transmission state. The transmission state herein may be that one or more radio link control layer service data units (for example, an RLC service data unit SDU (or an RLC SDU segment)) are not correctly received, or that a radio link control layer service data unit is not correctly sent out. By implementing this solution, when performing data transmission with a neighboring network node, the relay node does not need to execute an automatic repeat request (ARQ) mechanism or does not execute a retransmission mechanism similar to the ARQ mechanism on the transmitted data during the radio link control layer function processing in the relay node, so that data processing and transmission efficiency in the relay node is higher, a processing time of the data in the relay node is reduced. Therefore, an end-to-end data transmission latency of the communications system is reduced. Optionally, in the simplified RLC layer function processing in the relay node, segments corresponding to received RLC protocol data units (RLC PDU) are not reassembled and/or reordered. Herein, that the segments are not reassembled may be understood as: After RLC service data units (RLC SDU) are segmented, each segment correspondingly forms a new RLC PDU. During the processing at an RLC layer of the RN, a plurality of the formed RLC PDUs do not need to be restored to the complete RLC SDUs. that the segments are not reordered may be understood as: During the processing at the RLC layer of the RN, the foregoing received RLC PDUs are not sequentially delivered, after being sorted based on sequence numbers of the SDUs to which the RLC PDUs belong, to an upper layer or a transmit side for subsequent processing. Instead, the received RLC PDUs are directly delivered to the transmit side of the relay node for subsequent processing. In this way, data processing in the relay node is further simplified. Therefore, the end-to-end communication latency is further reduced.

With reference to any one of the foregoing implementations, in a seventh optional implementation of the first aspect, a data packet obtained after the adaptation function processing includes the information related to the adaptation function and the radio link control layer protocol data unit. In this implementation, the data packet obtained after the adaptation function processing may be considered as a data packet obtained by further adding the information related to the adaptation function to the radio link control layer protocol data unit. For example, the information related to the adaptation function may be added to header information of the RLC PDU. In this way, the uplink/downlink data can carry the information related to the adaptation function. This ensures that routing information required for data transmission and/or QoS information required for data transmission is provided.

According to a second aspect, this application provides a communication method. The method is applicable to a relay communications system. The method is mainly described from a perspective of a donor base station in the relay communications system, and includes: sending, by the donor base station after performing radio link control layer function processing and adaptation function processing on downlink data, downlink data obtained after the processing to a terminal device by using at least one relay node, where the downlink data sent to the terminal device includes at least one of the following information related to an adaptation function: information about an identifier of the terminal device, information about an identifier of the at least one relay node, information about an identifier of a QoS flow, information about an identifier of a protocol data unit session, information about an identifier of a radio bearer of the terminal device, and information about an identifier of a logical channel of the terminal device.

According to a first optional implementation of the second aspect, the radio link control layer function processing in the donor base station includes: for a radio link control layer protocol data unit that is not correctly sent to the terminal device, resending, to the terminal device by using the at least one relay node, the RLC PDU that is not correctly sent to the terminal device, where in the process in which the donor base station resends the RLC PDU to the terminal device, the at least one relay node may not identify whether the RLC PDU is an initially transmitted RLC PDU or a retransmitted RLC PDU; and/or sending a report about a receiving state of a radio link control layer service data unit to the terminal device by using the at least one relay node. For example, if the donor base station determines that one or more RLC PDUs from the terminal device are not received, the donor base station sends, to the terminal device, a report about a data packet that is not received. In a process of sending the report about the receiving state, the at least one relay node may not parse content of the report about the receiving state. Specifically, for example, if the RN learns, by using a data control (D/C) field and/or a control PDU type (CPT) field in header information of an RLC PDU, that a type of the RLC PDU is a control PDU, the RN determines that the RLC PDU carries the report about the state, and then, sends the control PDU to a data transmit end based on routing information in the information related to the adaptation function. The information related to the adaptation function may also be carried in the RLC PDU. By implementing this solution, a data retransmission mechanism similar to an ARQ mechanism is executed between the donor base station and the terminal device, to ensure end-to-end communication transmission quality in the relay communications system. When the relay node between the donor base station and the terminal device participates in end-to-end data transmission, in the radio link control layer function processing in the relay node, the mechanism similar to the ARQ mechanism does not need to be executed on the transmitted data, and/or the report about the receiving state of the radio link control layer service data unit does not need to be generated. This reduces a processing time of the data in the relay node, and reduces an end-to-end data transmission latency. Therefore, a better balance is achieved between ensuring end-to-end data transmission QoS of the system and reducing an end-to-end communication latency of the system.

According to a second optional implementation of the second aspect, a data packet obtained after the adaptation function processing in the donor base station includes the information related to the adaptation function and the radio link control layer protocol data unit. By implementing this solution, the data packet obtained after the adaptation function processing in the donor base station may be considered as a data packet obtained by further adding the information related to the adaptation function to the radio link control layer protocol data unit. For example, the information related to the adaptation function is added to the header information of the RLC PDU. In this way, the downlink data sent by the donor base station can carry the information related to the adaptation function. This ensures that routing information required for downlink data transmission and/or QoS information required for data transmission is provided.

According to a third aspect, this application provides a communication method. The method is applicable to a relay communications system. The method is mainly described from a perspective of a terminal device (for example, a UE) in the relay communications system, and includes: sending, by the terminal device after performing radio link control layer function processing and adaptation function processing on uplink data, uplink data to a donor base station by using at least one relay node, where the uplink data sent to the donor base station includes at least one of the following information related to an adaptation function: information about an identifier of the terminal device, information about an identifier of the at least one relay node, information about an identifier of the donor base station, information about an identifier of a QoS flow, information about an identifier of a protocol data unit session, information about an identifier of a radio bearer of the terminal device, and information about an identifier of a logical channel of the terminal device.

According to a first optional implementation of the third aspect, the radio link control layer function processing in the terminal device includes: retransmitting, by the terminal device by using the at least one relay node, a radio link control layer protocol data unit that is not correctly sent to the donor base station; and/or sending, by the terminal device, a report about a receiving state of a radio link control layer service data unit to the donor base station by using the at least one relay node, where in a process of sending the report, the at least one relay node may not parse the report about the receiving state. By implementing this solution, similar to the second aspect, when performing data transmission with a neighboring network node, the relay node does not need to execute, during the radio link control layer function processing of the relay node, an ARQ mechanism or an automatic repeat request mechanism similar to the ARQ mechanism on an RLC PDU received or sent by the relay node. Therefore, a processing time of the data in the relay node is reduced, and an end-to-end data transmission latency of the communications system is reduced. However, a data retransmission mechanism similar to the ARQ mechanism needs to be executed between the terminal device and the donor base station, to ensure end-to-end communication transmission quality of the relay communications system.

According to a second optional implementation of the third aspect, a data packet obtained after the adaptation function processing includes the information related to the adaptation function and the radio link control layer protocol data unit. By implementing this solution, the data packet obtained after the adaptation function processing may be considered as a data packet obtained by further adding the information related to the adaptation function to the radio link control layer protocol data unit. In this way, the uplink data sent by the terminal device can carry the information related to the adaptation function. This ensures that routing information required for uplink data transmission and/or QoS information required for data transmission is provided.

It may be understood that each implementation in each foregoing aspect may be applied in combination with another implementation in the aspect. For example, another implementation may be randomly selected, or a plurality of other implementations may be randomly selected, to be implemented in combination with the particular implementation, to resolve different technical problems.

According to a fourth aspect, this application provides a communications node. The communications node includes at least one processor and a communications interface, the communications interface is used by the communications node to perform communication interaction with another communications node, and the at least one processor is configured to execute a program instruction, to enable the communications node to implement a function of any one of the following devices in any one of the foregoing aspects and the optional implementations of the aspects: the first network node, the second network node, the third network node, the terminal device, the relay node, and the donor base station.

According to a fifth aspect, this application provides a system chip. The system chip includes at least one processor and a communications interface, the communications interface is used by the system chip to perform communication interaction with the outside, and the at least one processor is configured to execute a program instruction, to implement an operation of any one of the following devices in any one of the foregoing aspects and the optional implementations of the aspects: the first network node, the second network node, the third network node, the terminal device, the relay node, and the donor base station.

According to a sixth aspect, this application provides a computer storage medium. The storage medium stores a program instruction. When the program instruction is executed, any one of the foregoing aspects and the optional implementations of the aspects is performed. For example, when the program instruction is executed, an operation of any one of the following devices in any one of the foregoing aspects and the optional implementations of the aspects can be performed: the first network node, the second network node, the third network node, the terminal device, the relay node, and the donor base station.

DESCRIPTION OF EMBODIMENTS

For application of a next-generation relay communications system, on one hand, considering that there are abundant high-frequency carrier frequency resources, in a hotspot area, networking using high-frequency small cells is increasingly popular, to meet an ultra-high capacity requirement of 5G. A high-frequency carrier has a poor propagation feature, is severely attenuated due to blocking, and has small coverage. Therefore, a large quantity of small cells need to be densely deployed. Correspondingly, providing fiber backhaul for the large quantity of the densely deployed small cells is costly and difficult to implement. Therefore, an economical and convenient backhaul solution is required. On the other hand, when network coverage is provided in some remote areas to meet a requirement for wide coverage, optical fiber deployment is difficult and costly. Therefore, flexible and convenient access and backhaul solutions are also required. A radio relay technology provides a choice for resolving the foregoing two problems: An access link and a backhaul link of the radio relay technology each use a wireless transmission solution.

Compared with the fourth-generation mobile communications system defined in 3GPP R10, a new-generation communications system raises stricter requirements on network performance indicators. For example, the 5th generation (5G) mobile communication system raises requirements for increasing a network capacity indicator by 1000 times, wider coverage, ultra-high reliability and ultra-low latency, and the like.

Figure 1:
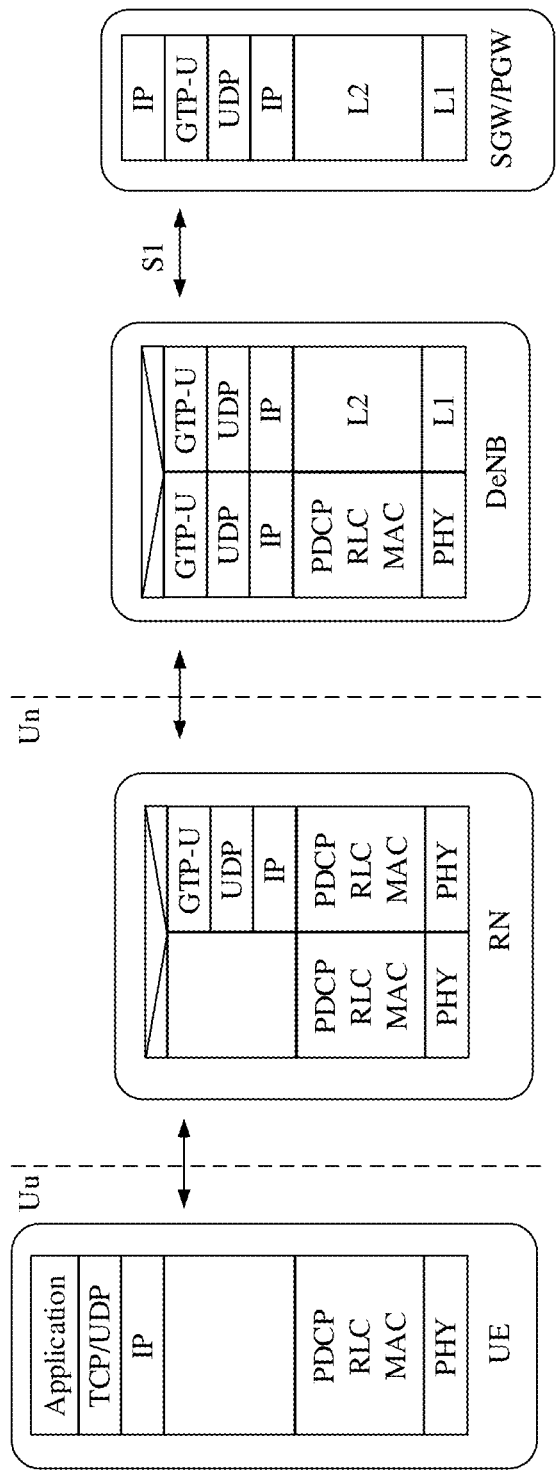
FIG. 1 is a schematic diagram of a radio relay communications system 100 in the related art.
Figure 2:
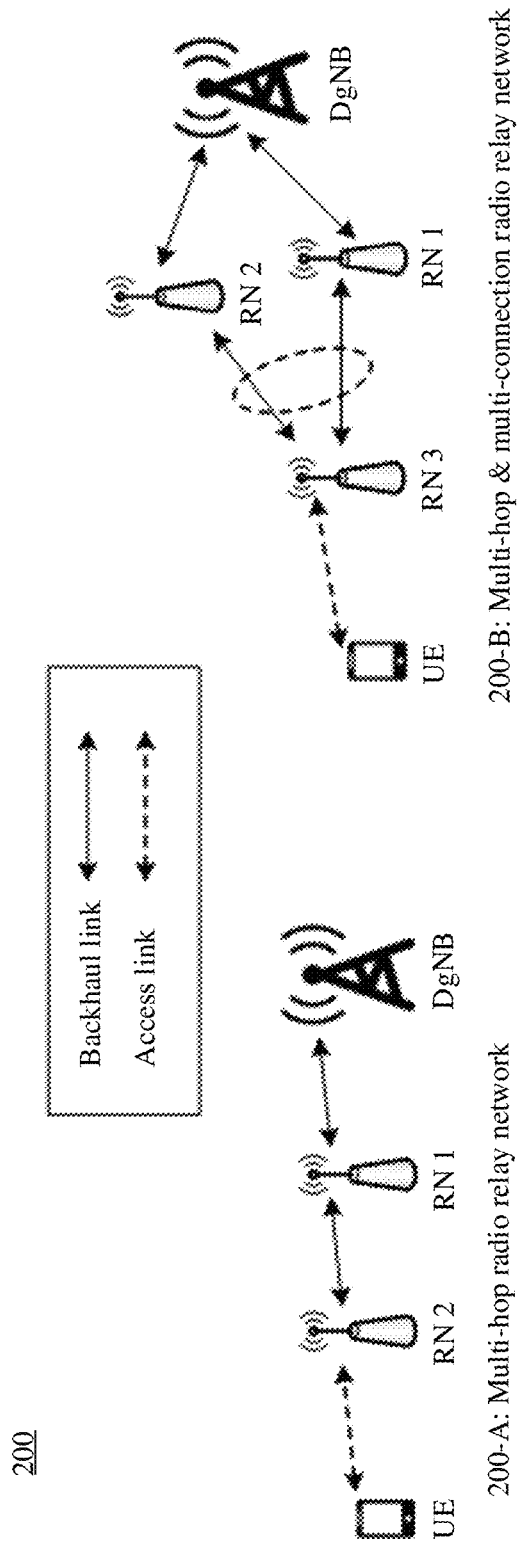
FIG. 2 is a schematic diagram of a radio relay communications system 200 according to an embodiment of this application.

In a 5G-oriented radio relay communication networking scenario, a multi-hop radio relay and multi-connection scenario needs to be supported. Correspondingly, in a radio relay communications system 200 shown in FIG. 2, in a multi-hop radio relay communication networking scenario, a network topology on a radio access network side may be considered as a tree-based topology (tree-based topology). To be specific, there is a clear hierarchical relationship between a relay node and a donor gNodeB (DgNB) serving the relay node. Each relay node considers, as a unique parent node, a node that provides a backhaul service to the relay node. A system 200-A shown in FIG. 2 is used as an example. The system includes UE, an RN 2, an RN 1, and a DgNB. The RN 2 considers, as a parent node of the RN 2, the node RN 1 that provides the backhaul service to the RN 2, and uplink and downlink data of the UE served by the RN 2 is transmitted through the unique parent node RN 1 of the RN 2. In the network system with a structure of the tree-based topology, each relay node may sequentially deliver, based on a dependency relationship, the uplink data of the UE to a parent node of the relay node, and finally, the uplink data is routed to the DgNB, and then is delivered to a core network through a data transmission tunnel between the DgNB and the core network. The downlink data of the UE served by the RN 2 is sent by the DgNB to the UE by using the RN 1 and the RN 2 sequentially in a transmission process. In a multi-hop and multi-connection radio relay networking scenario, a network topology on a radio access network side may be considered as a mesh topology or a directed acyclic graph (DAG). A system 200-B shown in FIG. 2 is used as an example. In the system, there are two links between an RN 3 and a DgNB. One link is RN 3-RN 2-DgNB, and the other link is RN 3-RN 1-DgNB. The RN 3 considers, as parent nodes, the node RN 2 and the node RN 1 that each provide a backhaul service to the RN 3.

It may be understood that when a method, a system, or an apparatus provided in the embodiments of this application is applied to a 5G network or a new radio (NR) system, a relay node or a wireless backhaul node in the following may be a relay node or a wireless backhaul node in the 5G network or the NR system. For example, in the 5G network or the NR system, the relay node or the wireless backhaul node may be referred to as an integrated access and backhaul (IAB) node, or certainly may have another name. This is not specifically limited in the embodiments of this application. When the method, the system, or the apparatus provided in the embodiments of this application is applied to an evolved packet system (EPS) network, the relay node or the wireless backhaul node in the following may be a wireless backhaul node in the EPS network. For example, the wireless backhaul node in the EPS network may be referred to as a relay node (RN). For example, the wireless backhaul node may be configured to provide a wireless backhaul service to a node (for example, a terminal) that accesses the wireless backhaul node in a wireless manner. The wireless backhaul service is a backhaul service provided through a wireless backhaul link.

It may be understood that the method, the system, or the apparatus provided in the embodiments of this application may be applied to an IAB network. In the IAB network, an IAB node may provide a wireless access service to a terminal, and is connected to a donor node through a wireless backhaul link, to transmit service data of a user. For example, the donor node may be a donor base station. The donor node in the 5G network may be referred to as an IAB donor or a DgNB (namely, a donor gNodeB) for short. The donor node may be a complete entity, or may be in a form in which a CU and a DU are separated. The CU of the donor node may be referred to as a donor-CU (or referred to as a CU for short), and the DU of the donor node may be referred to as a donor-DU (or referred to as a DU for short). That is, the donor node includes the donor-CU and the donor-DU. The donor-CU has functions of a service data adaptation protocol (SDAP) layer and a PDCP layer on a user plane, and has functions of a radio resource control (RRC) layer and a PDCP layer on a control plane. The donor DU has functions of a radio link control (RLC) layer, a media access control (MAC) layer, and a physical (PHY) layer. For example, the donor-CU may alternatively be in a form in which a user plane (UP) and a control plane (CP) are separated. That is, the donor-CU includes a CU-CP and a CU-UP. The IAB node is connected to a core network by using the donor node through a wired link (for example, in a system architecture of 5G NR independent networking, the IAB node is connected to a core network (5GC) of the 5G network by using the donor node through the wired link; and in a 5G architecture of 5G NR non-independent networking, the IAB node is connected, on a control plane (CP), to an evolved packet core network (EPC) by using an eNB (evolved NodeB), and is connected, on a user plane (UP), to the EPC by using the donor node and an eNB).

For example, the donor base station or the relay node in this application may be a radio access network device that has functions of all or some standard base stations and an enhanced feature for relay communication. In most scenarios, the standard base station is an apparatus that is deployed in a radio access network and that is configured to provide a wireless communication function to a terminal device, and an implementation form of the apparatus includes but is not limited to various forms of macro base stations, micro base stations (also referred to as small cells), transmission reception points (TRP), evolved NodeBs (eNB), NodeBs (NB), home eNodeBs (for example, home evolved NodeBs, or home NodeBs, HNB), and next-generation base stations (e.g., new generation radio access network node). The next-generation base station may be at least one of the following: a gNB, an NG eNB, a gNB having a central unit (CU) and a distributed unit (DU) that are separated, a CU, a DU, a baseband unit (BBU) that processes communication data, or the like, or may be a radio access network device of a non-3GPP system, such as a wireless local area network (WLAN) access device. In systems using different radio access technologies, names of base stations having similar functions of providing a wireless communication function to the terminal device may be different. In the embodiments of this application, the relay node may alternatively be implemented by using a terminal device that further has a relay function. A specific implementation of the relay node is not limited in this application.

For example, the terminal device in this application is a device that has a wireless transceiver function. The terminal device may be deployed on land, including an indoor or outdoor device, a handheld device, or a vehicle-mounted device, or may be deployed on a water surface (for example, a ship), or may be deployed in the air (for example, an airplane, a balloon, or a satellite). The terminal device may include various types of mobile phones, tablet computers, computers with a wireless transceiver function, customer premises equipment (CPE), residential gateway (RG) devices, wireless data cards, virtual reality (VR) terminal devices, augmented reality (AR) terminal devices, machine type communication (MTC) terminal devices, terminal devices in industrial control, terminal devices in self driving, terminal devices in remote medical, terminal devices in a smart grid, terminal devices in transportation safety, terminal devices in a smart city, smart households (e.g., household devices having a wireless communication function, such as a refrigerator, a television, a washing machine, and furniture), wearable devices (such as a smartwatch, a smart band, and a pedometer), and the like. Alternatively, the terminal device in this application may be a device that is disposed in a fixed position and that has a wireless communication function similar to that of the foregoing terminal device. In systems using different radio access technologies, names of terminal devices with similar wireless communication functions may be different. Merely for ease of description, in the embodiments of this application, the foregoing apparatuses with a wireless transceiver communication function are collectively referred to as a terminal device.

For example, the terms "first", "second", and the like in this application are merely used to distinguish between different objects, and "first" and "second" do not limit an actual order or functions of the objects modified by "first" and "second". For example, "first" and "second" in a "first network node" and a "second network node" are merely used to distinguish between the two different network nodes, and do not limit an actual order or functions of the two network nodes. Expressions "for example", "example", "such as", "an optional implementation", or "a implementation" used in this application are merely used to provide an example, illustration, or description. Any embodiment or implementation solution described as "for example", "example", "such as", "an optional implementation", or "a implementation" described in this application should not be construed as being more preferred or more advantageous than another embodiment or another implementation solution. To be specific, these terms are used to present a related concept in a specific manner. For example, the terms "uplink" and "downlink" in this application are used to describe a data and/or an information transmission direction in a specific scenario. For example, an "uplink" direction is usually a direction in which data and/or information is transmitted from a terminal device to a donor base station, and a "downlink" direction is usually a direction in which data and/or information is transmitted from the donor base station to the terminal device. It may be understood that "uplink" and "downlink" are merely used to describe the data and/or information transmission direction, and a specific start device and a specific end device of the data and/or information transmission are not limited.

For example, the term "and/or" in this application describes merely an association relationship for describing associated objects and represents that three relationships may exist. For example, A and/or B may represent the following three cases: Only A exists, both A and B exist, and only B exists. In addition, unless otherwise specified, the character "/" in this application usually indicates an "or" relationship between the former and latter objects.

For example, the character "-" in this application is usually used to indicate that there is a logical collaboration/association/mapping relationship between objects before and after the character. For example, in a multi-hop multi-connection relay communications system, if nodes such as an RN 1, an RN 2, and a DgNB form a communications link, the link may be represented as RN 1-RN 2-DgNB. Names are assigned to various objects that may be involved in this application, such as various messages/information/devices/network elements/systems/apparatuses/actions/operations/procedures/concepts. It may be understood that these specific names do not constitute a limitation on the related objects, and the assigned names may change with a factor such as a scenario, a context, or a usage habit. Technical meanings of technical terms in this application should be understood and determined mainly based on functions and technical effects that are of the technical terms and that are reflected/performed in the technical solutions.

For example, unless otherwise specified, an expression used in this application similar to an expression that "an item includes at least one of the following: A, B, and C" usually means that the item may be any one of the following cases: A; B; C; A and B; A and C; B and C; A, B, and C; A and A; A, A, and A; A, A, and B; A, A, and C; A, B, and B; A, C, and C; B and B; B, B and B; B, B and C; C and C; C, C, and C; and other combinations of A, B, and C. The foregoing uses three elements A, B, and C as an example to describe an optional case of the item. When the expression is "the item includes at least one of the following: A, B, . . . , and X", in other words, more elements are included in the expression, a case to which the item is applicable may also be obtained according to the foregoing rule.

For example, an expression similar to "information about an identifier of a project item" in this application usually refers to an identifier of the "item", for example, a specific name or a specific sequence number of the item, information that directly identifies the "item", or indirection information that has a correspondence with the "information that directly identifies the item". This is not limited in this specification.

For example, the descriptions in this application, such as "physical layer function processing" and "media access control layer function processing", may be understood as corresponding to implementing a basic function of a physical layer (PHY) and a basic function of a media access control (MAC) layer that are defined in the prior art, for example, functions of a PHY layer and a MAC layer that are defined in the 3GPP. The description "simplified radio link control layer function processing" in this application may be understood as implementing a basic function different from that of a radio link control (RLC) layer defined in the prior art. A specific meaning and feature of the "simplified radio link control layer function processing" may be determined with reference to the embodiments of this application, and are not specifically limited herein. The description "adaptation function processing" in this application may be understood as implementing a separate adaptation function, or may be understood as that the adaptation function is used as a part of the function of the physical layer or the MAC layer or a part of the function of the radio link control layer. In this case, the physical layer, the MAC layer, or the radio link control layer has the adaptation function processing, and therefore is different from the basic function of the physical layer, the basic function of the media access control layer or the basic function of the radio link control layer that is defined in the prior art. A specific meaning and feature of the physical layer, the MAC layer, and the radio link control layer each may be determined with reference to the embodiments of this application. This is not specifically limited herein.

The network architecture and the service scenario described in the embodiments of the present technology are intended to describe the technical solutions in the embodiments of the present technology more clearly, and do not constitute a limitation on the technical solutions provided in the embodiments of the present technology. A person of ordinary skill in the art may know that with the evolution of the network architecture and emergence of new service scenarios, the technical solutions provided in the embodiments of the present technology are also applicable to similar technical problems.

The following describes the technical solutions in this application with reference to the accompanying drawings.

Figure 3:
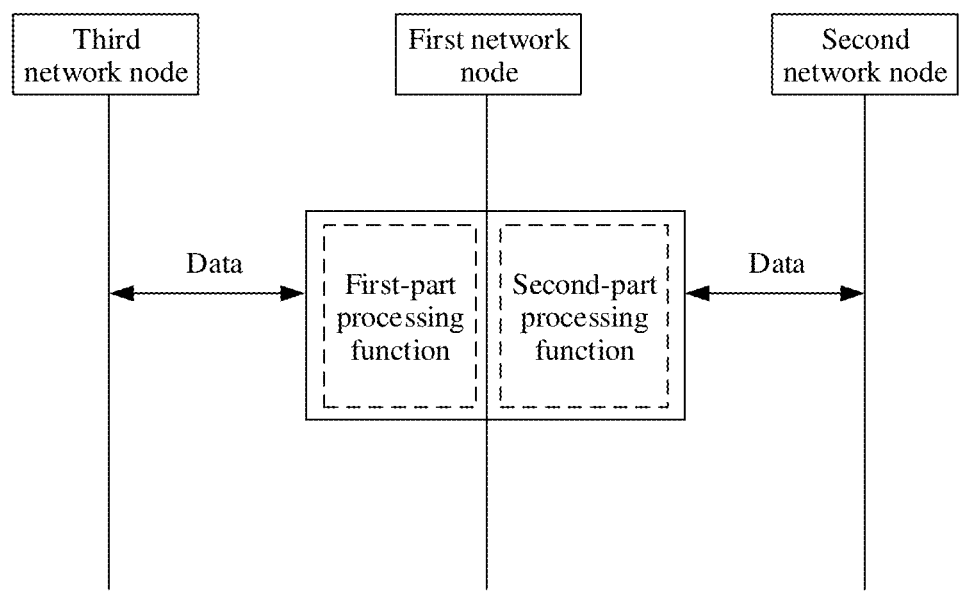
FIG. 3 is a schematic flowchart of a radio relay communications system 300 according to an embodiment of this application.

As shown in FIG. 3, an embodiment of this application provides a relay communications system 300. The system 300 includes a first network node, a second network node, and a third network node. The first network node and the second network node perform uplink/downlink data transmission through a communications interface between the first network node and the second network node, and the first network node and the third network node perform uplink/downlink data transmission through a communications interface between the first network node and the third network node. In a downlink data transmission scenario, for example, when data is sequentially transmitted by using the second network node, the first network node, and the third network node, the first network node is an RN, and the second network node is a donor base station or an RN that communicates with the first network node, and the third network node is a terminal device or another RN that communicates with the first network node. In an uplink data transmission scenario, for example, when data is sequentially transmitted by using the third network node, the first network node, and the second network node, the third network node is a terminal device or an RN that communicates with the first network node, the first network node is an RN, and the second network node is a donor base station or another RN that communicates with the first network node. It may be understood that the relay communications system 300 shown in FIG. 3 may be further extended as required. For example, one or more relay nodes may be disposed between the third network node and the first network node, and/or one or more relay nodes may be disposed between the first network node and the second network node. Based on this, a single-link multi-hop relay communications system or a multi-link multi-hop relay communications system may be formed as required.

With reference to the system 300 shown in FIG. 3, an embodiment of this application provides a communication method 300. In the method, various feasible implementations are described from a perspective of the first network node. The method 300 includes: receiving, by the first network node, data from the second network node; performing, in the first network node, first-part processing and second-part processing on the received data; and sending, by the first network node to the third network node, data obtained after the first-part processing and the second-part processing, where the first-part processing is at least one of the following: physical layer function processing, media access control layer function processing, and adaptation function processing; and the second-part processing is at least one of the following: simplified radio link control layer function processing, adaptation function processing, media access control layer function processing, and physical layer function processing. The communication method 300 may be applied to a relay communications system, and the first network node is a relay node in the relay communications system. By comparison, a relay node in the prior art almost has a complete base station capability. On the existing RN, a protocol stack configured on an interface between the RN and a DeNB includes: a PHY layer, a MAC layer, an RLC layer, a PDCP layer, an IP layer, a UDP layer, and a GTP-U. Compared with the prior art, the processing of the relay node proposed in the system and the method 300 greatly simplifies a protocol stack configuration, simplifies the processing in the relay node on the data, and reduces a processing time of the data in the relay node. Therefore, an end-to-end communication latency in the relay communications system including the first network node, the second network node, and the third network node is reduced.

According to an optional implementation of the method 300, the data from the second network node is downlink data, the second network node is a second relay node or a donor base station, and the third network node is a terminal device; the first-part processing and the second-part processing are sequentially performed on the downlink data; the first-part processing is: the physical layer function processing, the media access control layer function processing, and the adaptation function processing; and the second-part processing is: the simplified radio link control layer function processing, the media access control layer function processing, and the physical layer function processing. By implementing this approach, compared with the prior art, processing of the relay node on the downlink data is greatly simplified, and a processing time of the downlink-transmitted data in the relay node is reduced. Therefore, an end-to-end latency of downlink data transmission in a communications network including the first network node, the second network node, and the third network node. The downlink data that is received by the first network node or downlink data that is obtained after being processed by the first network node may include at least one of the following information related to an adaptation function: information about an identifier of the terminal device, information about an identifier of a QoS flow, information about an identifier of a protocol data unit session, information about an identifier of a radio bearer of the terminal device, and information about an identifier of a logical channel of the terminal device.

According to an optional implementation of the method 300, the data that is received by the first network node from the second network node is downlink data, the second network node is a donor base station or a relay node (for example, a third relay node) that communicates with the first network node, the third network node is a relay node (for example, a fourth relay node) that communicates with the first network node. A difference between this optional implementation and the foregoing optional implementation lies in that in the foregoing optional implementation, when the first network node sends data in a downlink, a node that directly communicates with the first network node in a downlink direction is the terminal device. However, in this implementation, a node that directly communicates with the first network node in the downlink direction is the another RN, and the downlink data sent by the first network node is sent to a terminal device by using the third network node. In the first network node, the first-part processing and the second-part processing are sequentially performed on the downlink data received by the first network node; the first-part processing is: the physical layer function processing, the media access control layer function processing, and the adaptation function processing; and the second-part processing is: the simplified radio link control layer function processing, the adaptation function processing, the media access control layer function processing, and the physical layer function processing. In an optional implementation, the downlink data that is received by the first network node or the downlink data that is sent after being processed in the first network node may include at least one of the following information related to the adaptation function: information about an identifier of a network node involved in downlink transmission (for example, at least one of information about an identifier of the first network node, information about an identifier of the fourth relay node, information about an identifier of a relay node that provides a service to the terminal device, and information about an identifier of the terminal device), information about an identifier of a QoS flow, information about an identifier of a protocol data unit session, information about an identifier of a radio bearer of the terminal device, and information about an identifier of a logical channel of the terminal device. The relay node that provides a service to the terminal device in this embodiment of this application may be a relay node that serves a serving cell accessed by the terminal device.

In the optional implementations related to the downlink data transmission in the foregoing method 300, the information about the identifier of the terminal device and/or the information about the identifier of the relay node involved in a transmission path (for example, the information about the identifier of the fourth relay node and/or the information about the identifier of the relay node that provides a service to the terminal device) may be used for routing selection during the downlink data transmission, to help a node in the transmission path obtain a correct next-hop node for the downlink data that needs to be transmitted, so as to ensure an efficient transmission process.

In the optional implementations related to the downlink data transmission in the foregoing method 300, the information about the identifier of the QoS flow, the information about the identifier of the protocol data unit session, the information about the identifier of the radio bearer of the terminal device, and the information about the identifier of the logical channel of the terminal device that are carried in the downlink data may be used to provide, in the transmission process, a required QoS guarantee to a service to which the downlink data belongs. Usually, the radio bearer and the QoS flow each may be used to reflect a basic transmission QoS requirement, and there may be a mapping relationship between the QoS flow and the radio bearer. Different protocol data unit sessions usually correspond to different radio bearers. For example, at least one radio bearer may be correspondingly established on an air interface for one protocol data unit session. The protocol data unit session may carry different QoS flows, and each QoS flow may have a different QoS requirement. In this way, the protocol data unit session may also have a corresponding QoS requirement based on the radio bearer corresponding to the protocol data unit session or the QoS flows carried in the protocol data unit session. Usually, there is a correspondence between the logical channel of the terminal device and the radio bearer of the terminal device. Therefore, when the downlink data carries the information about the identifier of the radio bearer of the terminal device and/or the information about the identifier of the logical channel of the terminal device, a corresponding downlink transmission QoS requirement of the downlink data is also indicated, so that the node in the transmission path performs transmission based on the QoS requirement. Certainly, when the downlink data carries the information about the identifier of the QoS flow, because the QoS flow reflects the basic transmission QoS requirement, the QoS requirement required by the downlink data transmission is also clearly indicated.

According to an optional implementation of the method 300, the data that is received by the first network node from the second network node is uplink data, the second network node is a terminal device, and the third network node is a donor base station or another relay node (for example, a fifth relay node) that communicates with the first network node; the first-part processing and the second-part processing are sequentially performed on the received uplink data in the first network node; the first-part processing is: the physical layer function processing and the media access control layer function processing; and the second-part processing is: the simplified radio link control layer function processing, the adaptation function processing, the media access control layer function processing, and the physical layer function processing. By implementing this approach, compared with the prior art, processing in the first network node (that is, the relay node) on the uplink-transmitted data is greatly simplified, and a processing time of the uplink-transmitted data in the relay node is reduced. Therefore, an end-to-end latency of uplink data transmission in the communications network including the first network node, the second network node, and the third network node is reduced. The uplink data that is received by the first network node or uplink data that is sent after being processed by the first network node may include at least one of the following information related to an adaptation function: information about an identifier of a node involved in the uplink transmission (for example, information about an identifier of the terminal device, information about an identifier of the first network node, information about an identifier of the fifth relay node, and information about an identifier of the donor base station), information about an identifier of a QoS flow, information about an identifier of a protocol data unit session, information about an identifier of a radio bearer of the terminal device, and information about an identifier of a logical channel of the terminal device. It may be understood that the information about the identifier of the terminal device and/or the information about the identifier of the protocol data unit session is added to the uplink data, so that the donor base station may send the uplink data of the protocol data unit session to a gateway device through a tunnel (for example, an N3 tunnel) corresponding to the protocol data unit session of the terminal device. For example, the gateway device is a user plane function (UPF).

According to an optional implementation of the method 300, the data received by the first network node from the second network node is uplink data, the second network node is another relay node (for example, a sixth relay node) that communicates with the first network node, and the third network node is a donor base station or another relay node (for example, a seventh relay node) that communicates with the first network node; the first network node sequentially performs the first-part processing and the second-part processing on the received uplink data; the first-part processing is: the physical layer function processing, the media access control layer function processing, and the adaptation function processing; and the second-part processing is: the simplified radio link control layer function processing, the adaptation function processing, the media access control layer function processing, and the physical layer function processing. The first network node sends uplink data obtained after the first-part processing and the second-part processing to the third network node. A difference between this optional implementation and the foregoing optional implementation lies in that in the foregoing optional implementation, the second network node that communicates with the first network node in an uplink direction is the terminal device. However, in this implementation, the second network node that communicates with the first network node in the uplink direction is the another relay node. By implementing this approach, compared with the prior art, processing of the relay node on the uplink data is simplified, and a processing time of the uplink-transmitted data in the relay node is reduced. Therefore, an end-to-end latency of the uplink data transmission in the relay communications system including the first network node, the second network node, and the third network node is reduced. In an optional implementation, the uplink data that is received by the first network node or uplink data that is sent to the third network node after being processed by the first network node may include at least one of the following information related to an adaptation function: information about an identifier of a network node involved in an uplink transmission path (for example, at least one of information about an identifier of the terminal device, information about an identifier of the first network node, information about an identifier of the sixth relay node, information about an identifier of the seventh relay node, information about an identifier of a relay node that provides a service to the terminal device, and information about an identifier of the donor base station), the information about the identifier of the QoS flow, information about an identifier of a QoS flow, information about an identifier of a protocol data unit session, information about an identifier of a radio bearer of the terminal device, and information about an identifier of a logical channel of the terminal device.

In the optional implementations related to the uplink data transmission in the foregoing method 300, the information about the identifier of the network node involved in the uplink transmission path, for example, any one or more of the information about the identifier of the terminal device, the information about the identifier of the first network node, the information about the identifier of the fifth relay node, the information about the identifier of the sixth relay node, the information about the identifier of the seventh relay node, the information about the identifier of the relay node that provides a service to the terminal device, and the information about the identifier of the donor base station may be used for routing selection during the uplink data transmission, to help an intermediate node in the transmission path obtain a correct next-hop node for the uplink data that needs to be transmitted. Further, optionally, the intermediate node in the transmission path may determine the next-hop node of the uplink data based on information about an identifier of an uplink transmit end such as the terminal device, and may determine the next-hop routing node in an indirect manner such as presetting a transmission path for the terminal device. In this case, the information about the identifier of the terminal device may also be used as the information related to the adaptation function, and is carried in the uplink-transmitted data packet.

In the optional implementations related to the uplink data transmission in the foregoing method 300, the information about the identifier of the QoS flow, the information about the identifier of the protocol data unit session, the information about the identifier of the radio bearer of the terminal device, and the information about the identifier of the logical channel of the terminal device that are carried in the uplink data may be used to provide, in the transmission process, a required QoS guarantee to a service to which the uplink data belongs. The radio bearer and the QoS flow each may be used to reflect a basic transmission QoS requirement, and there may be a mapping relationship between the QoS flow and the radio bearer. Different protocol data unit sessions usually correspond to different radio bearers. It may be understood that at least one radio bearer may be correspondingly established on an air interface for one PDU session. One protocol data unit session may further carry different QoS flows, and each QoS flow may have a different QoS requirement. In this way, the protocol data unit session may have a corresponding QoS requirement based on the radio bearer corresponding to the protocol data unit session or the QoS flows carried in the protocol data unit session. Usually, there is a correspondence between the logical channel of the terminal device and the radio bearer of the terminal device. Therefore, when the uplink data carries the information about the identifier of the radio bearer of the terminal device and/or the information about the identifier of the logical channel of the terminal device, a corresponding QoS requirement of the uplink data is also indicated, so that the node in the transmission path performs transmission according to the QoS requirement. When the uplink data carries the information about the identifier of the QoS flow, because the QoS flow is usually used to indicate the basic transmission QoS requirement, the QoS requirement required by the uplink data during transmission is also clearly indicated.

According to an optional implementation of the method 300, for the uplink data transmission or the downlink data transmission, during the simplified radio link control layer function processing performed in the first network node (for example, the relay node), a received radio link control layer protocol data unit is segmented, and obtained segments correspondingly form new radio link control layer protocol data units. In this way, the relay node has a function of segmenting the radio link control layer protocol data unit, so that the relay node can flexibly perform uplink/downlink data transmission. This improves system transmission efficiency and flexibility.

According to an optional implementation of the method 300, for the uplink data transmission or the downlink data transmission, during the simplified radio link control layer function processing performed in the first network node (for example, a relay node), the first network node performs at least one of the following operations on the radio link control layer protocol data unit.

Operation 1: The first network node skips retransmitting a radio link control layer protocol data unit that is not correctly sent out by the first network node. For example, for an RLC PDU sent by the first network node to another relay node, if the RLC PDU fails to be sent, or if the peer end does not correctly receive the RLC PDU, the first network node skips resending the RLC PDU to the another relay node.

Operation 2: The first network node skips feeding back, to a data transmit end, a receiving state for a radio link control layer protocol data unit that is not correctly received by the first network node. For example, for an RLC PDU sent by another relay node to the first network node, if the RLC PDU fails to be sent or the first network node does not correctly receive the RLC PDU, the first network node skips feeding back, to the another relay node, a situation that the RLC PDU is not correctly received.

Operation 3: The first network node sends a received report about a receiving state of a radio link control layer service data unit to a data transmit end, and the first network node does not parse the report about the receiving state. Optionally, it may also be understood as that the first network node only provides a transmission channel for the report about the receiving state, and does not learn of content of the report about the receiving state. The receiving state herein may be information indicating that one or more radio link control layer service data units (which may be, for example, an RLC service data unit SDU or an RLC SDU segment) are not correctly received.

Operation 4: The first network node skips performing segment reassembly on received radio link control layer protocol data units. Specifically, for example, usually, after a transmit end or any node between the transmit end and the first network node segments an RLC SDU, each segment correspondingly forms a new RLC PDU. During the processing at an RLC layer of the first network node, RLC PDUs corresponding to segments are not reassembled, and the plurality of formed RLC PDUs do not need to be concatenated to restore the original complete RLC SDU.

Operation 5: The first network node skips reordering received radio link control layer protocol data units. Specifically, for example, the received RLC PDUs are not sequentially delivered, after being sorted based on sequence numbers of SDUs to which the RLC PDUs belong, to an upper layer or a transmit side for subsequent processing. Instead, the received RLC PDUs are directly delivered to the transmit side of the first network node (for example, the relay node) for subsequent processing. However, in the prior art, the received RLC PDUs need to be sequentially delivered for subsequent processing, and consequently, a relatively long processing latency is caused.

By implementing this approach, when performing data transmission with a neighboring network node, during the radio link control layer function processing of the first network node, the first network node does not need to execute an automatic repeat request (ARQ) mechanism or does not execute a retransmission mechanism similar to the ARQ mechanism on the data received or sent by the first network node, and/or does not need to perform segment reassembly and/or reordering on the received RLC PDUs, so that data processing and transmission efficiency in the first network node (e.g., the relay node) is higher, and the processing time of the data in the relay node is further reduced. This further reduces the end-to-end data transmission latency of the communications system.

According to an optional implementation of the method 300, for the uplink data transmission or the downlink data transmission, a data packet obtained after the adaptation function processing in the first network node includes the information related to the adaptation function and the radio link control layer protocol data unit. For example, the data packet obtained after the adaptation function processing is obtained by adding the information related to the adaptation function to the RLC PDU. For example, the information related to the adaptation function may be added to header information of the RLC PDU. For another example, alternatively, the RLC PDU data packet may be encapsulated as a payload to form a relatively independent adaptation protocol layer data packet, and the foregoing information related to the adaptation function may be included in header information of the adaptation protocol layer data packet. By implementing this solution, the data packet obtained after the adaptation function processing may be considered as a data packet obtained by further adding the information related to the adaptation function to the radio link control layer protocol data unit. In this way, the uplink/downlink data can include information necessary for routing and/or a transmission QoS guarantee. This ensures reliable and efficient uplink/downlink data transmission.

With reference to the system 300 shown in FIG. 3, an embodiment of this application further provides a communication method 300-2. The method is mainly described from a perspective of a donor base station in the relay communications system, and includes: sending, by the donor base station after performing radio link control layer function processing and adaptation function processing on downlink data, downlink data obtained after the processing to a terminal device by using at least one relay node, where the downlink data sent by the donor base station to the terminal device includes at least one of the following information related to an adaptation function: information about an identifier of a network node involved in a downlink transmission path (for example, at least one of information about an identifier of the terminal device, information about an identifier of the at least one relay node, and information about an identifier of a relay node that provides a service to the terminal device), information about an identifier of a QoS flow, information about an identifier of a protocol data unit session, information about an identifier of a radio bearer of the terminal device, and information about an identifier of a logical channel of the terminal device.

According to an optional implementation of the method 300-2, the radio link control layer function processing in the donor base station includes: retransmitting, to the terminal device by using the at least one relay node, a radio link control layer protocol data unit that is not correctly received by the terminal device, where optionally, the at least one relay node does not need to identify whether the RLC SDU transmitted by the at least one relay node is an initially transmitted RLC SDU or a retransmitted RLC SDU; and/or sending, to the terminal device by using the at least one relay node, a report about a receiving state of a radio link control layer service data unit. For example, if the donor base station determines that one or more RLC SDUs (or some segments of the RLC SDUs) are not received, the donor base station sends, to the terminal device, a feedback that the RLC SDUs (or some segments of the RLC SDUs) are not correctly received. In the sending process, the report about the receiving state is not parsed by the at least one relay node. By implementing this approach, a data retransmission mechanism is executed between the donor base station and the terminal device. In this way, even if data transmission, between the relay node and a neighboring network node, at a radio link control layer does not use a data retransmission mechanism and/or a data transmission state feedback mechanism, end-to-end communication transmission quality of the relay communications system can be better ensured. In this way, a balance is achieved between reducing an end-to-end data transmission latency of the communications system and ensuring the transmission quality.

According to an optional implementation of the method 300-2, a data packet obtained after the adaptation function processing in the donor base station includes the information related to the adaptation function and the radio link control layer protocol data unit. For example, the data packet obtained after the adaptation function processing in the donor base station may be obtained by adding the information related to the adaptation function to header information of the RLC PDU, or obtained by encapsulating the RLC PDU data packet as a payload to form a relatively independent adaptation protocol layer data packet. The information related to the adaptation function may be included in header information of the adaptation protocol layer data packet. By implementing this solution, the information related to the adaptation function is further added to the radio link control layer protocol data unit. In this way, the downlink data can include information necessary for routing and/or a transmission QoS guarantee. This ensures reliable and efficient downlink data transmission.

With reference to the system 300 shown in FIG. 3, an embodiment of this application further provides a communication method 300-3. The method is mainly described from a perspective of a terminal device (for example, UE), and includes: sending, by the terminal device after performing radio link control layer function processing and adaptation function processing on data, data obtained after the processing to a donor base station by using at least one relay node, where the uplink data sent to the donor base station includes at least one of the following information related to an adaptation function: an identifier of a network node involved in an uplink transmission path (for example, at least one of information about an identifier of the terminal device, information about an identifier of the at least one relay node, information about an identifier of a relay node that provides a service to the terminal device, and information about an identifier of the donor base station), information about an identifier of a QoS flow, information about an identifier of a protocol data unit session, information about an identifier of a radio bearer of the terminal device, and information about an identifier of a logical channel of the terminal device.

According to an optional implementation of the method 300-3, the radio link control layer function processing in the terminal device includes: for a radio link control layer service data unit that is not correctly received by the donor base station, retransmitting, to the donor base station by using the at least one relay node, the RLC SDU that is not correctly transmitted, where the at least one relay node may not identify whether the RLC SDU transmitted by the at least one relay node is an initially transmitted RLC SDU or a retransmitted RLC SDU; and/or sending, by the terminal device to the donor base station by using the at least one relay node, a report about a receiving state of a radio link control layer service data unit. For example, if the terminal device determines that one or more RLC SDUs (or some segments of the RLC SDUs) are not received, the terminal device feeds back, to the donor base station, a report that the RLC SDUs (or some segments of the RLC SDUs) are not received. In a process of feeding back the report about the state to the donor base station by using the at least one relay node, the at least one relay node may not parse the report about the receiving state. By implementing this approach, a data retransmission mechanism is executed between the terminal device and the donor base station. In this way, even if data transmission, between the relay node and a neighboring network node, at a radio link control layer does not use a data retransmission mechanism and/or a transmission state feedback mechanism, end-to-end communication transmission quality of the relay communications system can be better ensured. In this way, a balance is achieved between reducing an end-to-end data transmission latency of the relay communications system and ensuring the transmission quality.

According to an optional implementation of the method 300-3, a data packet obtained after the adaptation function processing in the terminal device includes the information related to the adaptation function and the radio link control layer protocol data unit. For example, the data packet obtained after the adaptation function processing in the terminal device may be obtained by adding the information related to the adaptation function to header information of the RLC PDU, or obtained by encapsulating the RLC PDU data packet as a payload to form a relatively independent adaptation protocol layer data packet. The information related to the adaptation function may be included in header information of the adaptation protocol layer data packet. By implementing this solution, the information related to the adaptation function may be further added to the RLC PDU. In this way, the uplink data can include information necessary for routing and/or a transmission QoS guarantee. This ensures reliable and efficient uplink data transmission.

According to an optional implementation of the method 300, 300-2, or 300-3, at a data receiving end of the relay communications system, for example, at an RLC layer of the donor base station or the terminal device, received data packets may be reordered, and sequentially delivered to an upper layer for processing.

It may be understood that any optional implementation in the communication method 300, the communication method 300-2, and the communication method 300-3 provided in the foregoing embodiments may be applied in combination with another optional implementation. For example, another implementation may be randomly selected, or a plurality of other implementations may be randomly selected, to be implemented in combination with the implementation, to resolve different technical problems. Unless otherwise specified, an optional implementation in the following embodiments of this application may be applied in combination with another optional implementation according to the same principle. A combination manner is not limited herein.

Figure 4:
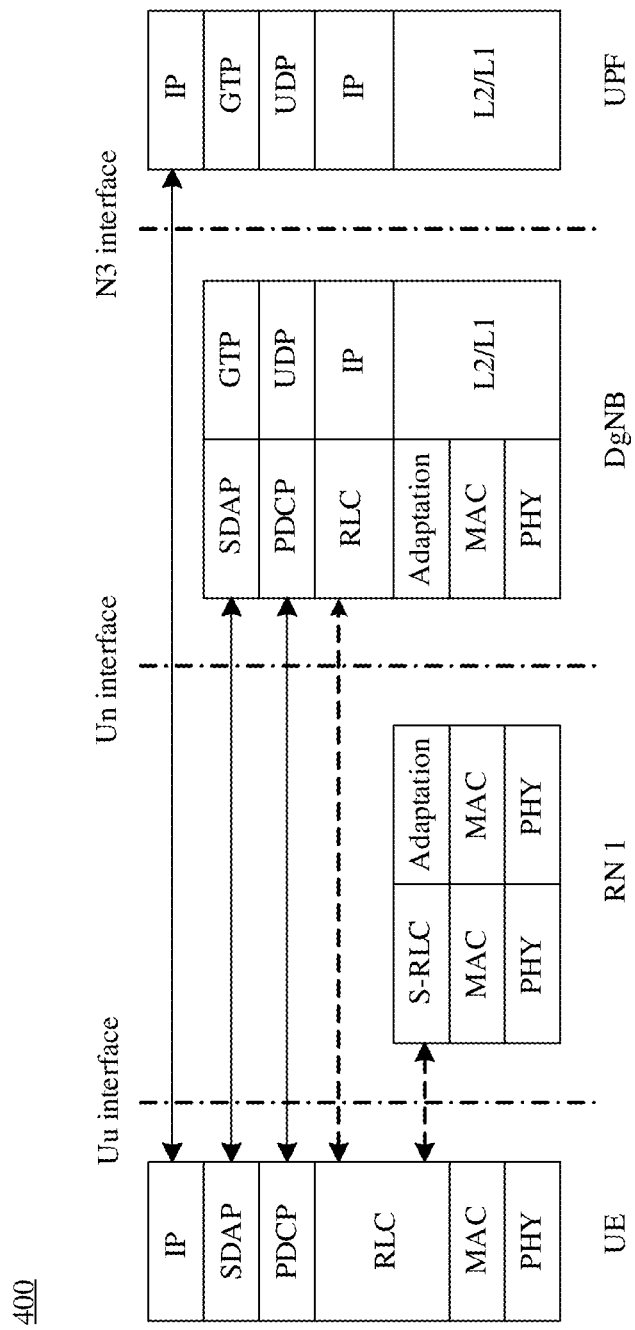
FIG. 4 is a schematic diagram of a radio relay communications system 400 according to an embodiment of this application.

Further, with reference to the implementation of the communications system 300 shown in FIG. 3, FIG. 4 shows a radio relay communications system 400. The system 400 is described from perspectives of downlink data transmission and a user plane protocol stack. The system 400 includes a user plane function (UPF) network element, a DgNB, an RN 1, and UE. The UE performs communication interaction with the RN 1 through an interface between the UE and the RN 1 (where the interface may be a Uu interface or an NR interface, and a name of the interface is not limited herein). The RN 1 performs communication interaction with the DgNB through an interface between the RN 1 and the DgNB (where the interface may be a Un interface, and a name of the interface is not limited herein). The DgNB performs communication interaction with the UPF through an interface between the DgNB and the UPF (where the interface may be an N3 interface, and a name of the interface is not limited herein). Logically, the UE may perform communication interaction with the DgNB by using functions of peer-to-peer communication protocol stacks. For example, the UE performs communication interaction with the DgNB by using peer-to-peer RLC layer protocol layers, peer-to-peer PDCP layer protocol layers, and peer-to-peer service data adaptation protocol (SDAP) layer protocol layers that are included in the UE and the DgNB. Logically, the UE also performs communication interaction with the UPF by using peer-to-peer IP layer protocol layers that are included in the UE and the UPF. The system 400 may be applied to a wireless single-hop relay scenario. In a typical wireless single-hop relay scenario, the relay communications system includes three network nodes: UE, an RN, and a DgNB, and the three network nodes can perform uplink/downlink communication interaction with each other. From a perspective of configuration of a user plane protocol stack, in the system 400, a protocol stack configured on the UE includes a PHY layer, a MAC layer, an RLC layer, a PDCP layer, an SDAP layer, and an IP layer. A protocol stack configured on a downlink transmit side of the RN 1 includes at least one of the following: a PHY layer, a MAC layer, and an S-RLC layer. A protocol stack configured on a downlink receive side of the RN 1 includes at least one of the following: a PHY layer and a MAC layer. The RN 1 further has an adaptation function, and the adaptation function may exist independently. For example, the adaptation function is used as an independent adaptation layer or a relatively independent adaptation function entity in the RN 1, or may be used as a part of the MAC layer on the downlink receive side of the RN 1, or may be used as a part of the S-RLC layer on the downlink transmit side of the RN 1. A protocol stack configured on a transmit side of the DgNB includes at least one of the following: a PHY layer, a MAC layer, an adaptation function, an RLC layer, a PDCP layer, and an SDAP layer. The adaptation function may exist independently in the DgNB. For example, the adaptation function is used as an independent adaptation layer or a relatively independent adaptation function entity in the DgNB, or may be used as a part of a function of the MAC layer on the downlink transmit side of the DgNB, or may be used as a part of the RLC layer on the downlink transmit side of the DgNB. A protocol stack configured on a downlink receive side of the DgNB includes a layer 1 (L1) and layer 2 (L2) protocol stack, an IP layer, a UDP layer, and a GTP layer. Correspondingly, a protocol stack configured on a UPF side includes an L1 and L2 protocol stack, an IP layer, a UDP layer, a GTP layer, and an IP layer. Herein, L1 and L2 configured on the DgNB and the UPF are usually protocol layers of wired communication, and depend on a specific connection technology used between the DgNB and the UPF. For example, L1 may be a physical layer, L2 may be a data link layer, and L2 may further include at least one of a MAC layer, a logical link control layer (LLC), a point to point protocol (PPP) layer, and a link layer of an Ethernet technology. Specific protocol layers included in L1 and L2 are not limited in this embodiment of this application.

Figure 5:
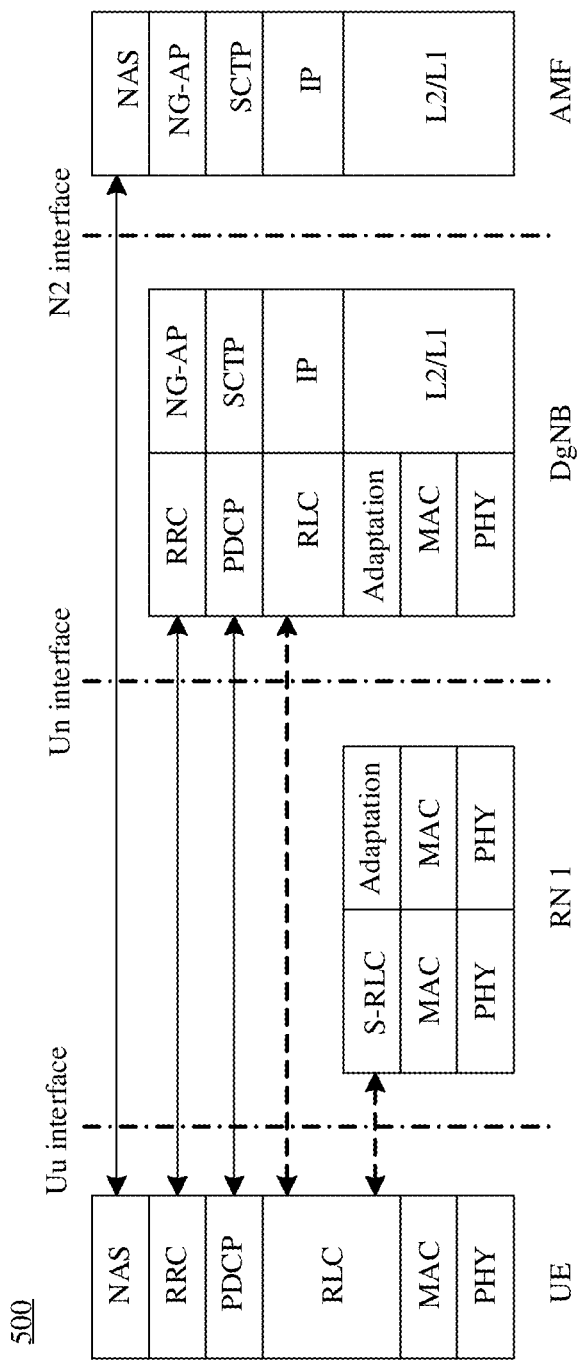
FIG. 5 is a schematic diagram of a radio relay communications system 500 according to an embodiment of this application.

With reference to the implementations of the system 300 and the system 400, FIG. 5 shows a relay communications system 500 according to an embodiment of this application. The system 500 is described by using a control plane protocol stack as an example. It may be understood that the control plane protocol stack shown in the system 500 is merely used as an example, and a specific implementation of the control plane protocol stack is not limited herein. The system 500 includes an access and mobility management function (AMF) entity, a DgNB, an RN 1, and UE. The UE performs communication interaction with the RN 1 through an interface between the UE and the RN 1 (where the interface may be a Uu interface or the like, and a name of the interface is not limited herein). The RN 1 performs communication interaction with the DgNB through an interface between the RN 1 and the DgNB (where the interface may be a Un interface, and a name of the interface is not limited herein). The DgNB performs communication interaction with the AMF through an interface between the DgNB and the AMF (where the interface may be an N2 interface, and a specific name of the interface is not limited herein). Logically, the UE may also perform communication interaction with the DgNB by using peer-to-peer protocol stacks included in the UE and the DgNB. For example, the UE performs communication interaction with the DgNB by using peer-to-peer RLC protocol layers, peer-to-peer PDCP protocol layers, and peer-to-peer radio resource control (RRC) protocol layers that are included in the UE and the DgNB. Logically, the UE may also perform communication interaction with the AMF by using peer-to-peer NAS protocol layers that are included in the UE and the AMF. In the system 500, a protocol stack configured on the UE includes a PHY layer, a MAC layer, an RLC layer, a PDCP layer, an RRC layer, and a non-access stratum (NAS). A protocol stack configured on a downlink transmit side of the RN 1 is at least one of the following: a PHY layer, a MAC layer, and an S-RLC layer. A protocol stack configured on a downlink receive side of the RN 1 is at least one of the following: a PHY layer and a MAC layer. The RN 1 further has an adaptation function, and the adaptation function may exist independently in the RN 1. For example, the adaptation function is used as an independent adaptation layer on the downlink receive side of the RN 1 or used as a relatively independent adaptation function entity in the RN 1, or may be used as a part of a function of the S-RLC layer on the downlink transmit side of the RN 1, or may be used as a part of the MAC layer on the downlink receive side of the RN 1. A protocol stack configured on a downlink transmit side of the DgNB includes at least one of the following: a PHY layer, a MAC layer, an adaptation (adaptation) function, an RLC layer, a PDCP layer, and an RRC layer. The adaptation function may exist independently in the DgNB. For example, the adaptation function is used as an independent adaptation layer on the downlink transmit side of the DgNB or a relatively independent adaptation function entity in the DgNB, or may be used as a part of a function of the MAC layer on the downlink transmit side of the DgNB, or may be used as a part of the RLC layer on the downlink transmit side of the DgNB. A protocol stack configured on a downlink receive side of the DgNB includes L1 and L2, an IP layer, a stream control transmission protocol (SCTP) layer, and an NG application protocol (NG-AP) layer. NG is an interface between a RAN and a core network in a 5G system, and may have a function similar to that of an S1 interface in LTE. Correspondingly, a protocol stack configured on the AMF includes L1 and L2, an IP layer, an SCTP layer, an NG-AP layer, and a NAS layer. Herein, L1 and L2 are usually protocol layers of wired communication. For example, L1 may be a physical layer, L2 may be a data link layer, and L2 may further include at least one of a MAC layer, a logical link control layer (LLC), a point to point protocol (PPP) layer, and a link layer of an Ethernet technology. Specific protocol layers included in L1 and L2 are not limited in this embodiment of this application.

Figure 6:
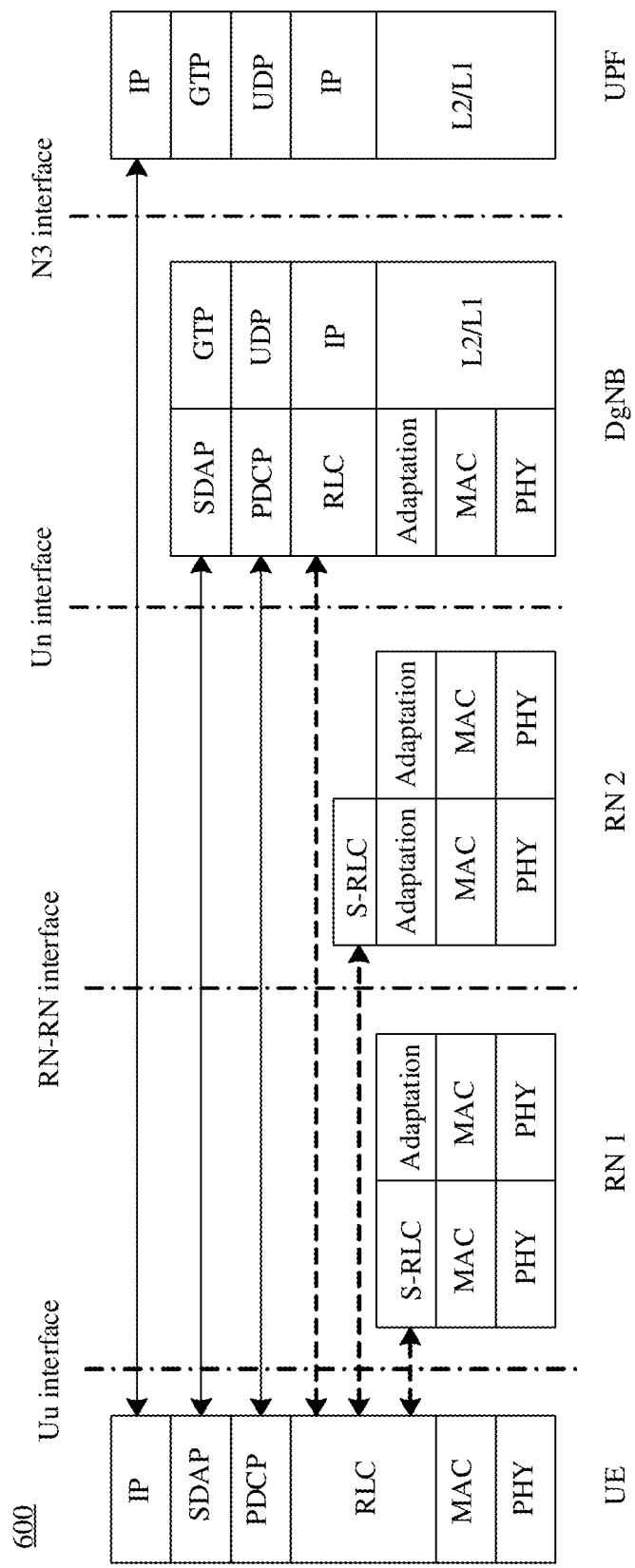
FIG. 6 is a schematic diagram of a radio relay communications system 600 according to an embodiment of this application.

Based on the radio relay communications system 400 shown in FIG. 4, FIG. 6 shows a radio relay communications system 600 for a wireless multi-hop relay scenario. The system 600 is described from perspectives of downlink data transmission and a user plane protocol stack. The system 600 includes a UPF, a DgNB, an RN 2, an RN 1, and UE. The UE performs communication interaction with the RN 1 through an interface between the UE and the RN 1 (where the interface may be a Uu interface or an NR interface, and a name of the interface is not limited herein). The RN 1 performs communication interaction with the RN 2 through an RN-RN interface between the RN 1 and the RN 2 (where the "RN-RN interface" herein indicates that the communications interface is an interface between two relay nodes, and a specific name is not limited). The RN 2 performs communication interaction with the DgNB through an interface between the RN 2 and the DgNB (where the interface may be a Un interface, and a name of the interface is not limited herein). The DgNB performs communication interaction with the UPF through an interface between the DgNB and the UPF (where, for example, the interface may be an N3 interface). Logically, the UE may also perform communication interaction with the DgNB by using peer-to-peer protocol stacks included in the UE and the DgNB. For example, the UE performs communication interaction with the DgNB by using peer-to-peer RLC protocol layers, peer-to-peer PDCP protocol layers, and peer-to-peer SDAP protocol layers that are included in the UE and the DgNB. Logically, the UE may also perform communication interaction with the UPF by using peer-to-peer IP protocol layers that are included in the UE and the UPF. As shown in the system 600, a protocol stack configured on the UE includes a PHY layer, a MAC layer, an RLC layer, a PDCP layer, an SDAP layer, and an IP layer. A protocol stack configured on a downlink transmit side of the relay node RN 1 is at least one of the following: a PHY layer, a MAC layer, and an S-RLC layer. A protocol stack configured on a downlink receive side of the relay node RN 1 is at least one of the following: a PHY layer and a MAC layer. The RN 1 further has an adaptation function, and the adaptation function may exist independently in the RN 1. For example, the adaptation function is used as an independent adaptation layer on the downlink receive side of the RN 1 or used as a relatively independent adaptation function entity in the RN 1, or may be used as a part of a function of the S-RLC layer on the downlink transmit side of the RN 1, or may be used as a part of the MAC layer on the downlink receive side of the RN 1. A protocol stack configured on a downlink transmit side of the RN 2 is at least one of the following: a PHY layer, a MAC layer, an adaptation function, and an S-RLC layer. The adaptation function may be used as a part of a function of the S-RLC layer on the downlink transmit side of the RN 2, or may be used as a part of the MAC layer on the downlink transmit side of the RN 2. A protocol stack configured on a downlink receive side of the RN 2 is at least one of the following: a PHY layer, a MAC layer, and an adaptation function. The adaptation function may be used as an independent protocol layer on the receive side of the RN 2, or may be used as a part of the MAC layer on the receive side of the RN 2, or may be used as an independent adaptation function entity in the RN 2. A protocol stack configured on a downlink transmit side of the DgNB includes at least one of the following: a PHY layer, a MAC layer, an adaptation function, an RLC layer, a PDCP layer, and an SDAP layer.

The adaptation function may be used as an independent protocol layer, or may be used as a part of a function of the MAC layer or the RLC layer in the DgNB. A protocol stack configured on a downlink receive side of the DgNB includes L1 and L2, an IP layer, a UDP layer, and a GTP layer. Correspondingly, a protocol stack configured on the UPF includes L1 and L2, an IP layer, a UDP layer, a GTP, and an IP layer. Herein, L1 and L2 are usually protocol layers of wired communication. For example, L1 may be a physical layer, L2 may be a data link layer, and L2 may further include at least one of a MAC layer, a logical link control layer (LLC), a point to point protocol (PPP) layer, and a link layer of an Ethernet technology. Specific protocol layers included in L1 and L2 are not limited in this embodiment of this application.

It can be learned from the protocol stack architectures of the systems shown in FIG. 4, FIG. 5, and FIG. 6 that, for the relay node RN 1 in the systems, for example, a protocol stack configuration of the RN 1 on the downlink transmit side is at least one of the following: the PHY layer, the MAC layer, and the S-RLC layer; and a protocol stack configuration of the RN 1 on the downlink receive side is at least one of the following: the PHY layer, the MAC layer, and the adaptation function. Therefore, it may be considered that the RN 1 has all or some functions of the layer 2. For example, for the relay node RN 2 in the systems, a protocol stack configuration of the relay node RN 2 on the downlink transmit side is at least one of the following: the PHY layer, the MAC layer, the adaptation function, and the S-RLC layer; and a protocol stack configuration on the downlink receive side is at least one of the following: the PHY layer, the MAC layer, and the adaptation function layer. Therefore, it may be considered that the RN 2 has all or some functions of the layer 2. It can be learned that, compared with the prior art, in the embodiments of this application, the protocol stack configurations of the RN 1 and the RN 2 and data processing in the RN 1 and the RN 2 are simplified, so that a processing time of downlink data in the relay node is reduced. Therefore, an end-to-end data transmission latency in the communications system is reduced.

For ease of description, a configuration of a processing function of the RN is described from a perspective of the "transmit side" and the "receive side". However, it may be understood that in the embodiments of this application, either of the S-RLC and the adaptation function configured on the RN node may be specifically deployed on the "transmit side" of the RN or the "receive side" of the RN, or may be deployed as an independent processing function entity, and whether the entity is on the "transmit side" or the "receive side" is not emphasized.

Figure 7A:
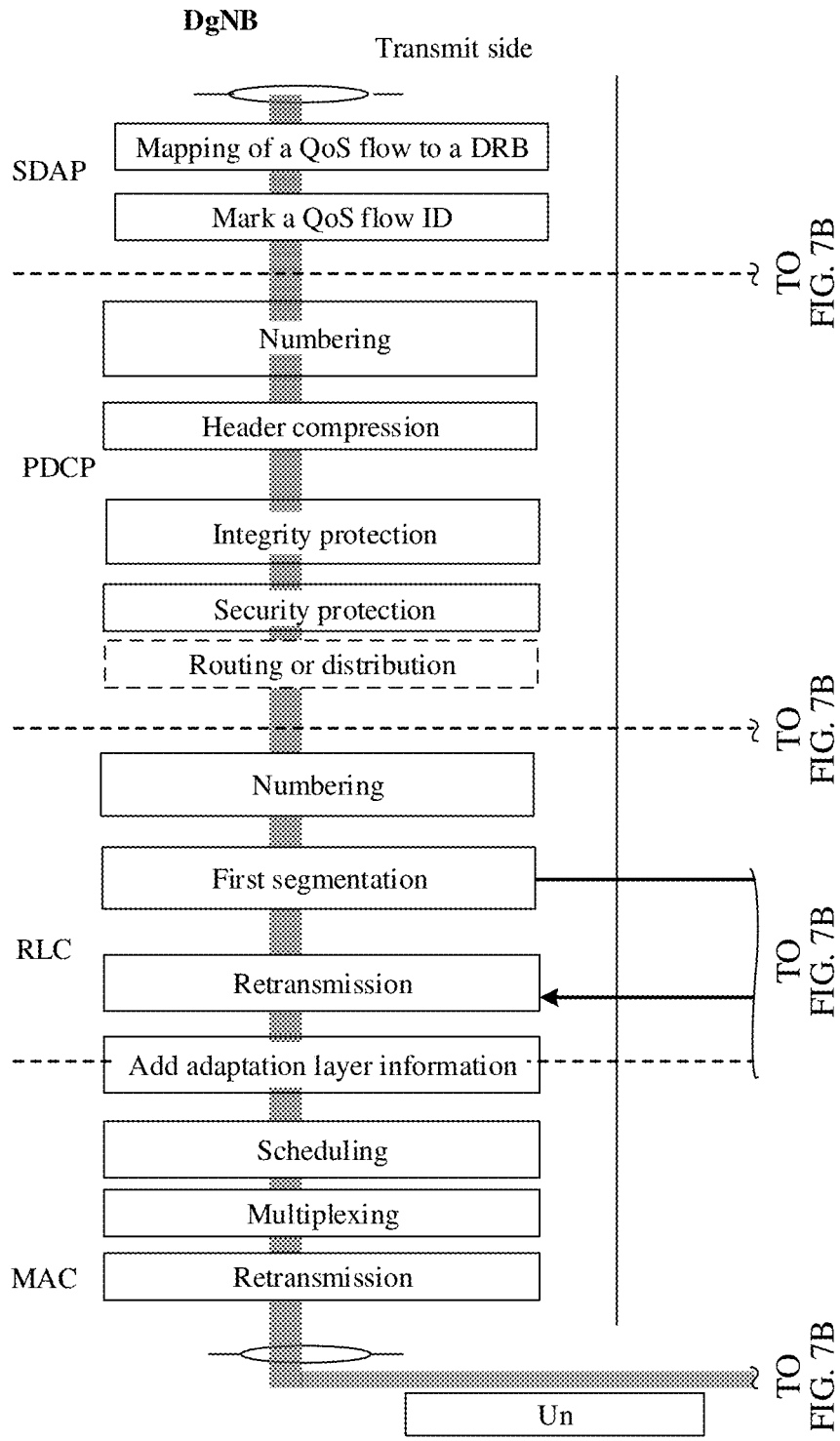
FIG. 7A and FIG. 7B are a schematic diagram of a radio relay communications system 700 according to an embodiment of this application.
Figure 7B:
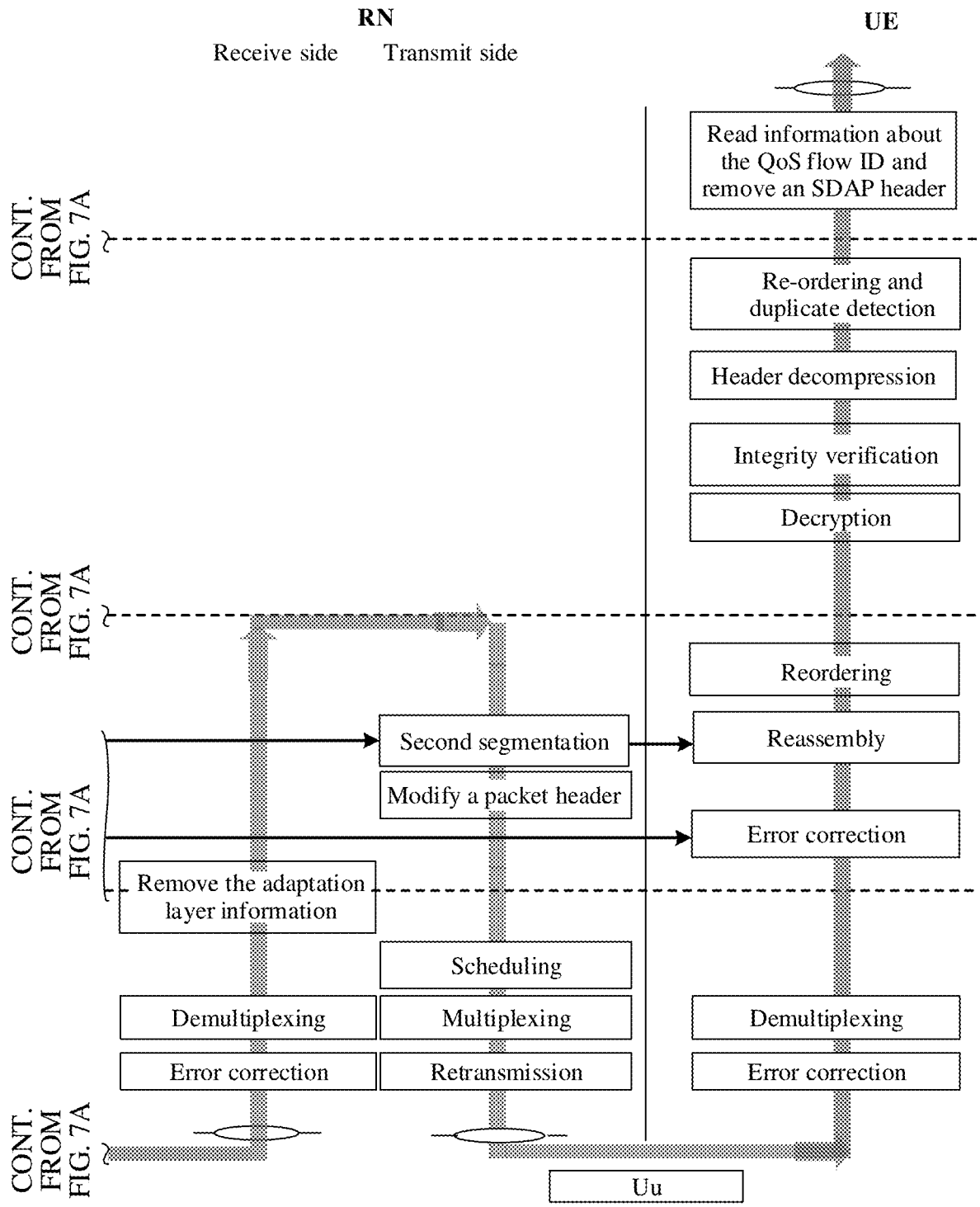

With reference to the implementation of at least one of the foregoing systems 300, 400, 500, and 600, FIG. 7A and FIG. 7B show a radio relay communications system 700 according to an embodiment of this application. The system 700 includes a transmit end in a radio access network, a relay node, and a terminal device. Specifically, the transmit end in the radio access network may be a donor gNodeB DgNB, the relay node may be an RN, and the terminal device may be UE. The DgNB performs communication interaction with the RN through an interface between the DgNB and the RN (where, for example, the interface may be a Un interface, and a specific name is not limited herein). The RN performs communication interaction with the UE through an interface between the RN and the UE (where the interface may be a Uu interface or an NR interface, and a specific name is not limited). The following describes composition and operation of the system 700 from perspective of functions of the nodes involved in the relay communications system and a downlink data processing procedure. The system 700 may operate according to mechanisms in the following examples.

Example 1

From a perspective of the transmit end (for example, the DgNB), of downlink data transmission, in the radio access network, processing on a user plane data packet from a core network includes at least one of the following operations:

Operation 1a: SDAP layer function processing performed in the DgNB. The processing herein may include at least one of the following:

(1) Perform mapping of a QoS flow to a data radio bearer (DRB) (mapping of QoS flow to DRB) of the UE on the downlink data packet.

(2) Add information about an identifier of the quality of service flow (QoS flow ID) to the downlink data packet from the core network, to mark the downlink data packet with the information about the identifier of the QoS flow.

The QoS flow herein has a function of indicating a QoS guarantee of a specific granularity. The information about the identifier of the QoS flow is added to the data packet, so that a transmission node can learn of a QoS requirement corresponding to the data packet, so that the transmission node can transmit the data packet based on a QoS requirement corresponding to the QoS flow ID.

Operation 1b: PDCP layer function processing performed in the DgNB. The processing herein may include at least one of the following:

(1) Number (e.g., sequence numbering) data packets, where the data packets herein may be PDCP SDUs, so that each PDCP PDU carries a PDCP layer sequence number of the PDCP PDU. (2) Perform a header compression operation. (3) Perform an integrity protection operation. (4) Perform a security-related protection (e.g., ciphering) operation. (5) Perform a packet routing or packet duplication (e.g., packet routing or duplication) operation. (6) Retransmit a PDCP SDU. (7) Transmit user data.

Operation 1c: RLC layer function processing performed in the DgNB. The processing herein includes at least one of the following:

(1) Number (e.g., sequence numbering) received PDCP PDUs or RLC SDUs. In this way, each RLC SDU has a sequence number of the RLC SDU.

(2) Perform the first data packet segmentation (e.g., 1st segmentation) at an RLC layer on the DgNB side, or perform re-segmentation on a retransmitted RLC SDU. For example, one RLC SDU may be segmented into at least two segments, each obtained segment may correspond to a new RLC PDU, and a sequence number of each RLC PDU obtained after the segmentation is the same as a sequence number of the segmented original RLC SDU, or there is a correspondence between a sequence number of each RLC PDU obtained after the segmentation and a sequence number of the segmented original RLC SDU. In some cases, for example, when air interface resources are relatively sufficient, the RLC SDU may not be segmented, and the downlink-transmitted data packet is the RLC SDU. Whether to perform segmentation is specifically determined based on an actual situation. This is not limited herein.

(3) Retransmit a data packet. The retransmission herein may be performed based on an automatic retransmission request mechanism, and the retransmitted data packet may be an RLC SDU or an RLC SDU segment. In some cases, for example, when the air interface resources are relatively sufficient, the RLC SDU is not segmented. In this case, the downlink-transmitted data packet is the RLC SDU, and the retransmitted data packet is also the corresponding RLC SDU. For another example, when MAC layer resources are relatively fewer, an RLC SDU that needs to be retransmitted may be segmented and then retransmitted. Alternatively, when an RLC state report fed back by the receiving end indicates that some segments of some RLC SDUs are not correctly received, the segments that are not correctly received may be retransmitted. Whether the specific retransmitted data packet is the RLC SDU or the RLC PDU obtained after the RLC SDU is segmented needs to be determined based on an actual situation. This is not limited herein.

For example, an RLC layer data retransmission mechanism executed between the donor gNodeB and the terminal device includes: if the DgNB receives an RLC state report (for example, a report, from the UE, about a receiving state of an RLC SDU) from the UE, resending, by the DgNB to the UE by using at least one RN, an RLC SDU (or an RLC SDU segment) that is not correctly sent to the UE, where in the process in which the DgNB resends the RLC SDU to the UE, the at least one relay node may not identify whether the RLC SDU is an initially transmitted RLC SDU or a retransmitted RLC SDU; and/or sending, by the DgNB, a report about a receiving state of an RLC SDU to the UE by using the at least one relay node. For example, if the DgNB determines that one or more RLC SDUs from the UE are not received or not correctly received, the DgNB sends, to the UE, a report about a receiving state of a data packet that is not received. In a process of sending the report about the receiving state to the UE, the RN may not parse content of the report about the state. The RN may learn, by using a D/C field and/or a CPT field in header information of an RLC PDU, that a type of the RLC PDU is a control PDU. In this way, the RN determines that the RLC PDU carries an RLC state report, and then, sends the control RLC PDU to the data transmit end based on routing information in information related to an adaptation function. The information related to the adaptation function may also be carried in the RLC PDU. By implementing this solution, the data retransmission mechanism is executed between the donor gNodeB and the terminal device. This better ensures end-to-end communication transmission quality of the relay communications system.

In an optional implementation, the RLC PDU obtained after the RLC layer function processing in the donor gNodeB meets the following "packet structure 1".

| Packet structure 1: | | | | | | |
|---|---|---|---|---|---|---|
| D/C | P | SI | R | SN | SO | Data |

Specifically, the "packet structure 1" includes at least one of the following: a D/C field, a P field, an SI field, an R field, an SN field, an SO field, and a data field.

(1) D/C is used to indicate a data/control field, and information carried in the D/C field is used to indicate that the RLC PDU is an RLC layer data PDU. In other words, the RLC PDU may be understood as carrying user data. Alternatively, the information carried in the D/C field indicates that the RLC PDU is an RLC layer control PDU. In other words, the RLC PDU may be understood as carrying control information. When the RLC PDU is the control PDU, the foregoing packet structure may further include a control PDU type (CPT) field. A value in the CPT field may indicate that the control information carried in the RLC control PDU may be the report about the receiving state of the RLC SDU, or other control information required by the system. In an optional implementation of the CPT field in the control RLC PDU, if the value of the CPT field is "000", it indicates that the RLC PDU is a control RLC PDU including a receiving state of a data packet.

A function of the D/C field may be applicable to an RLC PDU transmission mechanism with an acknowledged mode (AM).

(2) P is used to indicate a polling field. In the "packet structure 1", the field may include a polling bit used to request the report about the receiving state of the RLC SDU from an AM RLC function entity of a peer transmission end. The AM RLC function entity may be a part of a function of the RLC layer.

A function of the polling bit may be applicable to the RLC PDU transmission mechanism with the AM mode.

(3) SI is used to indicate a segmentation information field, and information carried in the field is used to indicate that the RLC PDU includes a complete RLC SDU. Alternatively, information carried in the field is used to indicate that the RLC PDU is a segment corresponding to an RLC SDU. For example, the segment is the first segment of the RLC SDU, or the segment is an intermediate segment of the RLC SDU, or the segment is the last segment of the RLC SDU.

(4) The SN is used to indicate a sequence number field, and the SN field is used to indicate a sequence number of the RLC SDU corresponding to the RLC PDU.

In the AM mode, RLC PDUs corresponding to different segments of a same RLC SDU have a same SN. In unacknowledged mode (UM), when data in the RLC PDU is a segment of the RLC SDU, the RLC PDU has the SN field.

(5) R is used to indicate a reserved bit, and this field is optional. For example, if the SN field in the RLC PDU has a specific length, the reserved bit is set. Alternatively, to reduce system overheads, the reserved bit may not be set for the RLC PDU. Optionally, the reserved bit may alternatively be used to indicate the information related to the adaptation function in this embodiment of this application. In this way, the adaptation function may be used as a part of the function of the RLC layer, and the information related to the adaptation function, for example, information related to routing and QoS, is included in the RLC PDU packet.

(6) The SO is used to indicate a segment offset field, and the field is used to indicate a relative position, of the RLC SDU segment corresponding to the RLC PDU, in the original RLC SDU. When the data in the RLC PDU is the RLC SDU segment and is not the first segment, the SO field is set in the RLC PDU; or when the data in the RLC PDU is the RLC SDU segment and is the first segment, the SO field may not be set in the RLC PDU.

(7) Data is used to represent a data field. Content of the data field may be the original RLC SDU (this is applicable to a case in which the original RLC SDU is not segmented), or content of the data field may be a segment of the original RLC SDU (this applicable to a case in which the original RLC SDU is segmented).

Operation 1d: Adaptation function processing performed in the DgNB. The processing herein includes: adding the information related to the adaptation function to the RLC PDU, for example, adding information used for data packet routing and/or QoS mapping. The information used for data packet routing and/or QoS mapping includes at least one of the following: information about an identifier of a network node involved in a downlink transmission path (for example, at least one of information about an identifier of the UE, information about an identifier of an RN that provides a service to the UE, information about an identifier of a transmission path, and information about an identifier of the DgNB), the information about the identifier of the QoS flow, information about an identifier of the radio bearer of the UE, information about an identifier of a logical channel of the UE, information about an identifier of a radio bearer of the interface between the DgNB and the RN, and information about an identifier of a logical channel of the interface between the DgNB and the RN. Herein, the RN that provides a service to the terminal device may be an RN that serves a serving cell accessed by the terminal device. The information is added to the downlink data packet, to help an intermediate node in the transmission path obtain a correct next-hop node for the downlink data that needs to be transmitted.

In an optional implementation, the information related to the adaptation function may not need to include the information about the identifier of the bearer between the DgNB and the RN, and/or may not need to include the information about the identifier of the logical channel between the DgNB and the RN. It may be understood that the RN may obtain the foregoing information related to the adaptation function that is carried in the data packet, and then add, based on a requirement, required information related to the adaptation function to a downlink data packet that is sent out after being processed by the RN, to meet a requirement on routing and a QoS guarantee of downlink data transmission.

Optionally, the adaptation function may further include QoS mapping processing. For example, the processing is mapping from the QoS flow or the DRB of the UE to a bearer or a logical channel of a next hop. For example, in a single-hop relay system, a bearer from the RN to the UE may be directly determined based on a DRB ID of the UE. For another example, the processing may be mapping from a bearer/logical channel of a previous hop to a bearer/logical channel of a next hop.

For example, it may be considered that the data packet obtained after the adaptation function processing in the DgNB is obtained by further adding the information related to the adaptation function to the RLC PDU. For example, the information related to the adaptation function is indicated by using the reserved bit or a newly added bit in the header information of the RLC PDU.

The adaptation function herein may be implemented as an independent protocol layer in the DgNB. For example, an independent adaptation function protocol layer is configured in a protocol stack of the DgNB, and the adaptation function protocol layer may be logically between the RLC layer and a MAC layer of the DgNB, or may be used as an independent adaptation function entity in the DgNB. The adaptation function may alternatively be used as a part of a logical function of the RLC layer in the DgNB. In this case, because the function of the RLC layer includes the foregoing adaptation layer function, the function of the RLC layer is different from a function of a conventional RLC layer. For example, the existing reserved bit or a newly added field is used based on the "packet structure 1", to store the information related to the adaptation function in this embodiment of this application. In this case, a used packet structure is different from the "packet structure 1". The adaptation function may alternatively be used as a part of a logical function of the MAC layer in the DgNB. In this case, because the function of the MAC layer includes the foregoing adaptation layer function, the function of the MAC layer is different from a function of a conventional MAC layer. In conclusion, an implementation of the adaptation function is not specifically limited herein.

Operation 1e: MAC layer function processing and PHY layer function processing performed in the DgNB. The processing at the MAC layer herein may include at least one of the following: scheduling (e.g., scheduling or priority handling) processing, multiplexing processing, and HARQ mechanism-based retransmission processing. After the MAC layer function processing, the downlink data is processed at a PHY layer, and then is sent to the RN by using the interface between the DgNB and the UE.

It should be noted that, for ease of description, the foregoing operations are numbered in sequence. However, it may be understood that this does not mean that a procedure of the method needs to be performed in the sequence of the numbers, and specific steps that need to be performed need to be determined based on a specific technical problem to be resolved. Numbering the steps in sequence does not mean that each of the steps needs to be performed.

According to the system 700, the following further describes the embodiments of the present invention from a perspective of a relay node RN. Processing, in the RN, on the downlink data sent by the DgNB may include two cases. In a first case, the RN that processes the downlink data performs direct communication interaction with the UE, and this is applicable to a single-hop relay scenario or a multi-hop relay scenario. In a second case, the RN that processes the downlink data needs to perform communication interaction with the UE by using another RN, and this is applicable to a multi-hop relay scenario. The two cases are separately described as follows:

Example 2

The single-hop relay scenario is used as an example. In this scenario, there is only one relay node on a relay communications link, the relay node is located between the terminal device and the donor gNodeB, the relay node directly performs communication interaction with the terminal device, and the relay node directly performs communication interaction with the donor gNodeB. The processing, in the relay node RN, on the downlink data includes at least one of the following operations.

Operation 2a: A receive side of the RN performs PHY layer function processing and MAC layer function processing on the received downlink data. Herein, the PHY layer function processing and the MAC layer function processing include at least one of the following: using a HARQ mechanism to perform error correction on receiving of the downlink data, demultiplexing, and the like.

Operation 2b: The RN performs at least one of the following processing related to an adaptation function on the downlink data.

(1) The RN learns of, from the received downlink data packet, the information related to the adaptation function, for example, information used for data packet routing and/or information used for QoS mapping. The information used for data packet routing and/or the information used for QoS mapping includes at least one of the following: the information about the identifier of the UE, the information about the identifier of the RN that provides a service to the UE, the information about the identifier of the transmission path, the information about the identifier of the DgNB, the information about the identifier of the QoS flow, information about an identifier of a PDU session, the information about the identifier of the radio bearer of the UE, and the information about the identifier of the logical channel of the UE. Herein, the RN that provides a service to the terminal device may be a relay node to which a serving cell accessed by the terminal device belongs. The information is added to the downlink data packet, to help an intermediate node in the transmission path obtain a correct next-hop node for the downlink data that needs to be transmitted.

(2) Determine a next hop route. For example, the RN may learn, based on the information about the identifier of the UE that is carried in the data packet, that a next-hop node to which the data packet is to be transmitted is the UE.

(3) The RN determines a radio bearer or a logical channel required for sending the downlink data packet. For example, optionally, a radio bearer or a logical channel used for sending the downlink data through an interface between the RN and the UE is determined based on a QoS parameter and/or a QoS mapping rule configured by a network side (for example, configured by a core network element or the DgNB for the RN, or locally configured by the RN), and/or a logical channel or a radio bearer, of the RN, corresponding to the received downlink data. Alternatively, optionally, a radio bearer or a logical channel used for sending the downlink data through an interface between the RN and the UE is determined based on a QoS parameter and/or a QoS mapping rule configured by a network side (for example, configured by a core network element or the DgNB for the RN, or locally configured by the RN), and/or the identifier of the QoS flow that is carried in the received downlink data packet. Alternatively, optionally, a radio bearer or a logical channel used for sending the downlink data through an interface between the RN and the UE is determined by the RN based on the information about the identifier of the radio bearer of the UE or the information about the identifier of the logical channel of the UE that is carried in the data packet. It may be understood that, usually, there is a correspondence between the logical channel of the terminal device and the radio bearer of the terminal device, and the radio bearer usually has a QoS requirement guarantee of a corresponding granularity. In this case, when the downlink data carries the information about the identifier of the logical channel of the UE or the information about the identifier of the radio bearer corresponding to the logical channel, a QoS requirement corresponding to a service to which the downlink data belongs is also indicated. Different PDU sessions usually correspond to different radio bearers. At least one radio bearer may be established on an air interface to correspond to one PDU session. One PDU session may further carry different QoS flows, and each QoS flow may have a different QoS requirement. In this way, the protocol data unit session may have a corresponding QoS requirement based on the radio bearer corresponding to the protocol data unit session or the QoS flows carried in the protocol data unit session. Certainly, if the downlink data carries the information about the identifier of the QoS flow, the QoS requirement of the service to which the downlink data belongs is also indicated.

(4) Remove the information related to the adaptation function from the downlink data packet, for example, remove an adaptation information packet header.

Herein, the adaptation function processing (for example, identification, deletion, or addition of the information related to the adaptation function) in the RN may be implemented on a downlink receive side on the RN side. For example, the adaptation function processing may be implemented as an independent function module (for example, a logical function protocol layer) that is disposed above a MAC layer on the downlink receive side of the RN; or may be used as a part of a function of an existing protocol layer on the downlink receive side of the RN, for example, a part of a MAC layer function entity on the downlink receive side. In this case, because a function of the MAC layer includes the foregoing adaptation layer function, the function of the MAC layer is different from a function of a conventional MAC layer. If an RLC layer is configured on the downlink receive side of the RN, the adaptation function may alternatively be used as a part of a logical function of the RLC layer on the downlink receive side. The adaptation function processing may alternatively be implemented on a downlink transmit side on the RN side. For example, the adaptation function processing may be implemented as an independent function module (for example, a logical function protocol layer) on the downlink transmit side of the RN; or may be used as a part of a function of an existing protocol layer on the downlink transmit side of the RN, for example, a part of an RLC function entity on the downlink transmit side.

The related processing function related to the adaptation function may alternatively be separately deployed. For example, a part of the adaptation function is deployed as an independent function entity, a part of the adaptation function is used as a part of the function of the RLC protocol layer, or another part of the adaptation function may be used as a part of the function of the MAC layer. For example, routing information processing in the adaptation function processing may be used as an independent part deployed in any one of the foregoing manners, or QoS information processing in the adaptation function processing may be used as an independent part deployed in any one of the foregoing manners. Specific division to and deployment of sub-functions in the adaptation function are not limited herein.

It may be understood that, for the adaptation function processing (for example, identification, deletion, or addition of the information related to the adaptation function), if the adaptation function is implemented by adding an independent protocol layer, the protocol layer may be correspondingly referred to as an adaptation layer protocol, but a specific name is not limited herein.

If the adaptation function is implemented in the function of the RLC layer in the RN node, optionally, the information used for data packet routing and/or the information used for QoS mapping may be included in header information of an RLC PDU. For example, the information is indicated by using a newly added bit in the header information of the RLC PDU, or the information is indicated by using a reserved bit in the header information of the RLC PDU.

If the adaptation function is implemented in the function of the MAC layer in the RN node, optionally, the information used for data packet routing and/or the information used for QoS mapping may be included in header information of a MAC SDU.

Optionally, the adaptation processing function may alternatively be implemented in a common processing module in the RN, to support implementation of functions of the receive side and the transmit side of the RN.

In conclusion, an implementation of the adaptation function in the RN is not specifically limited herein.

Operation 2c: The RN performs RLC layer function processing on the downlink data. The RLC layer function processing herein includes at least one of the following:

1: On the transmit side of the RN, segment the RLC PDU (for example, an RLC SDU or an RLC SDU segment that is included in the RLC PDU). If the received RLC PDU is an RLC PDU obtained after an RLC SDU is segmented, the segmentation herein may be referred to as re-segmentation, and the second segmentation herein may be relative to a case in which the DgNB has performed segmentation. The transmit side of the RN segments the received RLC PDU, to be specific, performs segmentation processing on the RLC SDU or the RLC SDU segment that is included in the data field in the received RLC PDU. The RN adds RLC layer header information to obtained new segments, to correspondingly form new RLC PDUs. For example, one RLC PDU may be segmented into at least two segments, and each segment may correspond to a new RLC PDU. In the case of re-segmentation, each obtained new RLC PDU includes a sequence number (SN) in the original RLC PDU, and the sequence number in the original RLC PDU is the same as or has a correspondence with a sequence number of an initial RLC SDU. After the transmit side of the RN node performs segmentation processing on the downlink data packet, the obtained RLC PDU meets the foregoing "packet structure 1". Optionally, during the processing at the RLC layer of the RN, a re-segmentation operation may not be performed on an RLC state report PDU.

2: The RN node performs "modification 1" on the RLC PDU packet, and the "modification 1" includes at least one of the following processing:

2.1: Keep the sequence number SN of the RLC PDU unchanged.

2.2: Keep the D/C field of the RLC PDU unchanged.

2.3: Add indication information to the SI field or a frame information (FI) field, where the indication information is used to indicate that the RLC PDU is a complete packet (for example, the data field in the RLC PDU is the original RLC SDU that is not segmented), and/or the indication information is used to indicate a segment that corresponds to the RLC PDU and that is generated based on the original RLC SDU (that is, a new RLC PDU obtained after the RN performs segmentation processing). For example, a value set of the FI/SI field is {00, 01, 10, 11}, and a meaning corresponding to a range of the value set is {complete packet/SDU, first segment, last segment, intermediate segment} (where { } herein represents the range of the value set, and has the same meaning below). A value of the FI/SI field may be as follows:

2.3.1: If the RN does not segment the received RLC PDU, the information of the FI/SI field in the RLC PDU may remain unchanged.

2.3.2: If the RLC PDU received by the RN is a complete data packet, for example, the data field in the RLC PDU corresponds to the original RLC SDU that is not segmented, the RN segments the data packet, and an FI/SI field in an RLC PDU obtained after the segmentation is different from the FI/SI field in the RLC PDU before the segmentation, and a value range of the FI/SI field changes from 00 to {01, 10, 11}.

2.3.3: If the value of the FI/SI field in the RLC PDU received by the RN is 01, the RN segments the data packet, and a value of an FI/SI field in an RLC PDU corresponding to the first segment obtained after the segmentation herein is 01. A value of an FI/SI field of an RLC PDU corresponding to each remaining segment is 11.

2.3.4: If the value of FI/SI field in the RLC PDU received by the RN is 11, the RN segments the data packet, and a value of an FI/SI field in an RLC PDU corresponding to each new segment obtained after the segmentation herein is 11.

2.3.5: If the value of the FI/SI field in the RLC PDU received by the RN is 10, the RN segments the data packet, and a value of an FI/SI field in a new RLC PDU corresponding to the last segment obtained after the segmentation herein is 10, and FI/SI of each remaining segment is 11.

2.4: Process the segment offset SO field. The SO field is used to indicate a position of a segment in the original RLC SDU. The processing on the SO field herein includes at least one of the following:

2.4.1: If the RN does not segment the received RLC PDU, and if the RLC PDU has the SO field, keep content of the SO field unchanged.

2.4.2: If the value of the FI/SI field of the RLC PDU received by the RN is 00 or 01, the data field in the RLC PDU received by the RN node is the complete RLC SDU or the first segment of the original RLC SDU. If the RN segments the RLC PDU, a new RLC PDU corresponding to the first segment obtained after the segmentation may not carry the SO field, and a value of an SO field in a new RLC PDU corresponding to each remaining segment obtained after the segmentation may be set with reference to a position, of the first byte in an RLC SDU segment corresponding to a data field in each remaining new RLC PDU, in the original RLC SDU. For example, in a possible manner, the value of the SO field in each remaining new RLC PDU is set as a value corresponding to a position, of the first byte in the RLC SDU segment corresponding to the data field in each new RLC PDU, in the RLC SDU or the first segment of the RLC SDU, where the RLC SDU or the first segment of the RLC SDU corresponds to the data field in the RLC PDU data packet received by the RN.

2.4.3: If the value of the FI/SI field of the RLC PDU received by the RN is 11 or 10, the RLC PDU received by the RN node is an intermediate segment or a tail segment. If the RN segments the received RLC PDU data packet, an SO field in a new RLC PDU corresponding to the first segment obtained after the segmentation is the same as the SO filed in the RLC PDU data packet received by the RN node, and a value of an SO field in a new RLC PDU corresponding to each remaining segment obtained after the segmentation may be set with reference to a position, of the first byte in an RLC SDU segment corresponding to a data field in each remaining new RLC PDU, in the original RLC SDU. For example, in a possible manner, the value of the SO field in each remaining new RLC PDU is set as adding the value of the SO field in the RLC SDU data packet received by the RN to a value corresponding to a position, of the first byte in the RLC SDU segment corresponding to the data field in each new RLC PDU, in the RLC SDU segment corresponding to the data field in the RLC PDU received by the RN.

For processing on the SO field, for example, a data packet whose length is 100 bytes (the data packet may be the original RLC SDU) is segmented into three segments, a length of the first segment is 20 bytes, a length of the second segment is 30 bytes, and a length of the third segment is 50 bytes. In this case, a value of SO field in an RLC PDU corresponding to the first segment is 0, a value of SO field in an RLC PDU corresponding to the second segment is 20, and a value of SO field in an RLC PDU corresponding to the third segment is 50. If the third segment is further segmented into two segments whose lengths are respectively 40 bytes and 10 bytes, a value of SO field in an RLC PDU corresponding to the first sub-segment of the third segment is 50, and a value of SO field in an RLC PDU corresponding to the second sub-segment of the third segment is 90.

3: Skip executing a data retransmission mechanism at the RLC layer of the RN. Specifically, the processing includes at least one of the following:

The RN skips retransmitting an RLC PDU in any one of the following cases: a data receiving end does not correctly receive the RLC PDU sent out by the RN; the data receiving end feeds back that the RLC PDU is not correctly received; the data receiving end feeds back that an RLC SDU or an RLC SDU segment corresponding to a data field in the RLC PDU is not correctly received; or whether the data receiving end receives the RLC PDU is not considered.

The RN skips feeding back a receiving state to the data transmit end for the RLC PDU/SDU/SDU segment that is not correctly received; and the RN sends a received report about a receiving state of an RLC SDU to the data transmit end, but may not parse content of the report about the receiving state. For example, if the RN learns of, by using a D/C field and/or a CPT field in header information of the RLC PDU, that a type of the RLC PDU is a control PDU, the RN determines that the RLC PDU carries the report about the state, and then sends the control PDU to the data transmit end based on routing information in the information related to the adaptation function. The report about the receiving state may be from the UE or may be from the DgNB. The receiving state herein may be a situation that one or more RLC SDUs or RLC SDU segments are not correctly received.

By implementing this solution, when the RN performs data transmission with a neighboring network node, during the radio link control layer function processing of the RN, the RN does not need to feed back a state to the data transmit end when the RN does not receive expected data, and also does not need to retransmit data that is sent out by the RN but is not correctly received by the receiving end, so that data processing and transmission efficiency in the relay node is higher, and a processing time of the data in the relay node is reduced. Therefore, an end-to-end data transmission latency of the communications system is reduced. Because the function of the RLC layer of the RN does not generate the report about the data receiving state, and does not retransmit the downlink RLC PDU based on the report about the data receiving state that is sent by the UE, the RN does not need to configure a retransmit buffer at the RLC layer. This reduces system resource overheads.

Optionally, during the RLC layer function processing in the RN, segments corresponding to received RLC PDUs may not be reassembled and/or reordered. Herein, that the segments are not reassembled may be understood as: After RLC SDUs are segmented, each obtained segment correspondingly forms a new RLC PDU. During processing at the RLC layer of the RN, a plurality of the formed RLC PDUs do not need to be restored to the complete RLC SDUs. That the segments are not reordered may be understood as: During processing at the RLC layer of the RN, the RLC PDUs received by the RN are not sequentially delivered, after being sorted based on sequence numbers of the SDUs to which the RLC PDUs belong, to an upper layer or the transmit side for subsequent processing. Instead, the received RLC PDUs are directly delivered to the transmit side of the RN for subsequent processing. In this way, data processing in the relay node is further simplified. Therefore, the end-to-end communication latency is further reduced.

Optionally, an ARQ-based retransmission mechanism may also be introduced into the RLC layer processing performed by the transmit side of the RN on the downlink data packet, to improve data transmission reliability. Introducing an ARQ mechanism into the foregoing simplified RLC layer function, for example, performing a part that is not required to be performed in the foregoing implementations, may increase a processing latency. Therefore, a balance between improving transmission QoS by executing the ARQ mechanism in the RLC function of the RN and reducing the end-to-end communication latency needs to be implemented based on an actual situation.

The RLC layer processing function herein may be deployed on the downlink receive side of the RN node, may be deployed on the downlink transmit side of the RN node, or may be deployed in a common processing module of the RN node.

Further, optionally, an adaptation function may be introduced to process the downlink data packet that has been processed by the RLC layer of the RN. For example, on the downlink transmit side of the RN, the information used for data packet routing and/or the information used for QoS mapping is added to the downlink data packet. The information used for data packet routing and/or the information used for QoS mapping includes at least one of the following: the information about the identifier of the UE, the information about the identifier of the RN node that provides a service to the UE in a relay transmission link, the information about the identifier of the DgNB that provides a service to the UE, the information about the identifier of the transmission path, the information about the identifier of the PDU session, the information about the identifier of the QoS flow, the information about the identifier of the radio bearer of the UE, and the information about the identifier of the logical channel of the UE. For example, the information used for data packet routing and/or the information used for QoS mapping may be included in the header information of the RLC PDU. For example, the information is indicated by using a newly added field in the header information of the RLC PDU, or the information is indicated by using the reserved bit in the header information of the RLC PDU. Herein, the RN that provides a service to the terminal device may be an RN that serves a serving cell accessed by the terminal device.

Operation 2d: The RN performs MAC layer processing and PHY layer processing on the downlink data packet.

For example, the transmit side of the RN delivers the RLC PDU to the MAC layer and the PHY layer for sequential processing, and then sends the RLC PDU to the receiving end UE.

Optionally, the MAC layer on the receive side of the RN and/or the MAC layer on the transmit side of the RN may reserve the HARQ-based data retransmission mechanism, and perform, in the data transmission process, operations such as feedback and retransmission that are in the HARQ retransmission mechanism, to further ensure data transmission reliability.

It should be noted that, for ease of description, the foregoing operations are numbered in sequence. However, it may be understood that this does not mean that a procedure of the method needs to be performed in the sequence of the numbers, and does not mean that each numbered operation needs to be performed.

Example 3

In the second case, that is, in the multi-hop relay scenario, there are a plurality RN nodes in the relay communications system. One of the RN nodes receives downlink data from the DgNB, processes the downlink data, and then delivers the downlink data to a next RN (where the next RN is not shown in the system 700). When a next hop of the RN node is the UE, for data processing in the RN node, refer to Example 2. When the next hop of the RN node is the another RN, for data processing in the RN node, refer to Example 3. According to Example 3, the data processing in the RN node includes at least one of the following operations:

Operation 3a: A receive side of the RN performs PHY layer processing and MAC layer processing on the received downlink data. For processing of 3a herein, refer to the manner of 2a.

Operation 3b: The RN performs at least one of the following adaptation function processing on the downlink data.

(1) The RN learns of, from the received downlink data packet, information related to the adaptation function, for example, information used for data packet routing and/or information used for QoS mapping. The information used for data packet routing and/or the information used for QoS mapping includes at least one of the following: information about an identifier of the UE, information about an identifier of the RN that provides a service to the UE, information about an identifier of the next-hop RN, information about an identifier of a transmission path, information about an identifier of the DgNB, information about an identifier of a QoS flow, information about an identifier of a PDU session, information about an identifier of a radio bearer of the UE, information about an identifier of a logical channel of the UE, information about an identifier of a radio bearer of an interface between the RN and a previous-hop node (for example, the DgNB or another RN), and information about an identifier of a logical channel of the interface between the RN and the previous-hop node. Herein, the RN that provides a service to the terminal device may be an RN that serves a serving cell accessed by the terminal device. It may be understood that the information used for data packet routing or QoS mapping is not limited in this embodiment of this application, and may be any other parameter or information that can be used for routing or transmission QoS.

(2) The RN determines a route. Routing-related information is added to the downlink data packet, to help an intermediate node in the transmission path obtain a correct next-hop node for the downlink data that needs to be transmitted. For example, the RN may learn of, based on the information about the identifier of the UE, the information about the identifier of the next-hop RN, the information about the identifier of the transmission path, or the information about the identifier of the RN that provides a service to the UE that is carried in the data packet, the next-hop node to which the data packet is to be transmitted. Optionally, a routing policy involved herein may be configured by a network side, for example, configured by the DgNB, or may be locally configured by the RN.

(3) The RN determines a radio bearer or a logical channel required for sending the downlink data packet. Optionally, a radio bearer or a logical channel used for sending the downlink data through an interface between the RN and the next-hop node (for example, another RN or the UE) is determined based on a QoS parameter and/or a QoS mapping rule configured by the network side (for example, configured by the core network element or the DgNB for the RN, or locally configured by the RN), and/or a logical channel or a radio bearer, of the RN, corresponding to the received downlink data. Alternatively, optionally, a radio bearer or a logical channel used for sending the downlink data through an interface between the RN and the next-hop node (for example, another RN or the UE) is determined based on a QoS parameter and/or a QoS mapping rule configured by the network side (for example, configured by the core network element or the DgNB for the RN, or locally configured by the RN), and/or the identifier of the QoS flow that is carried in the received downlink data packet. Alternatively, a radio bearer or a logical channel used for sending the downlink data through an interface between the RN and the next-hop node (for example, another RN or the UE) is determined by the RN based on the information about the identifier of the radio bearer of the UE or the information about the identifier of the logical channel of the UE that is carried in the data packet.

It may be understood that, usually, there is a correspondence between the radio logical channel and the radio bearer, and the radio bearer usually has a QoS requirement guarantee of a corresponding granularity. In this case, when the downlink data carries the information about the identifier of the logical channel or the information about the identifier of the radio bearer corresponding to the logical channel, a QoS requirement corresponding to a service to which the downlink data belongs is also indicated. Different PDU sessions usually correspond to different radio bearers. At least one radio bearer may be correspondingly established on an air interface for one PDU session. One PDU session may further carry different QoS flows, and each QoS flow may have a different QoS requirement. In this way, the protocol data unit session may have a corresponding QoS requirement based on the radio bearer corresponding to the protocol data unit session or the QoS flows carried in the protocol data unit session. Certainly, if the downlink data carries the information about the identifier of the QoS flow, the QoS requirement of the service to which the downlink data belongs is also indicated.

(4) Remove the information related to the adaptation function from the downlink data packet, for example, remove an adaptation information packet header.

Herein, the adaptation function processing (for example, identification, deletion, or addition of the information related to the adaptation function) in the RN may be implemented on a downlink receive side on the RN side. For example, the adaptation function processing may be implemented as an independent function module (for example, a logical function protocol layer) that is disposed above a MAC layer on the downlink receive side of the RN; or may be used as a part of a function of an existing protocol layer on the downlink receive side of the RN, for example, a part of a MAC layer function entity on the downlink receive side. In this case, because a function of the MAC layer includes the foregoing adaptation layer function, the function of the MAC layer is different from a function of a conventional MAC layer. If an RLC layer is configured on the downlink receive side of the RN, the adaptation function may alternatively be used as a part of a logical function of the RLC layer on the downlink receive side. The adaptation function processing may alternatively be implemented on a downlink transmit side on the RN side. For example, the adaptation function processing may be implemented as an independent function module (for example, a logical function protocol layer) on the downlink transmit side of the RN; or may be used as a part of a function of an existing protocol layer on the downlink transmit side of the RN, for example, a part of an RLC function entity configured on the downlink transmit side.

The related processing function related to the adaptation function may alternatively be separately deployed. For example, a part of the adaptation function is deployed as an independent function entity, a part of the adaptation function is used as a part of the function of the RLC protocol layer, or another part of the adaptation function may be used as a part of the function of the MAC layer. For example, routing information processing involved in the adaptation function processing may be used as an independent part deployed in any one of the foregoing manners, or QoS information processing involved in the adaptation function processing may be used as an independent part deployed in any one of the foregoing manners. Specific division to and deployment of sub-functions in the adaptation function are not limited herein.

In an optional implementation, if the adaptation function is implemented in the function of the RLC layer in the RN node, the information used for data packet routing and/or the information used for QoS mapping may be included in header information of an RLC PDU. For example, the information is indicated by using a newly added bit in the header information of the RLC PDU, or the information is indicated by using a reserved bit in the header information of the RLC PDU.

In an optional implementation, if the adaptation function is implemented in the function of the MAC layer in the RN node, the information used for data packet routing and/or the information used for QoS mapping may be included in header information of a MAC SDU.

It may be understood that, for the adaptation function processing (for example, identification, deletion, or addition of the information related to the adaptation function), if the adaptation function is implemented by adding an independent protocol layer, the protocol layer may be correspondingly referred to as an adaptation layer protocol, but a specific name is not limited herein. The foregoing information related to the adaptation function may be included in header information of an adaptation layer PDU.

In an optional implementation, the adaptation processing function may alternatively be implemented in a common processing module in the RN, to support implementation of functions of the receive side and the transmit side of the RN.

In conclusion, an implementation of the adaptation function in the RN is not specifically limited herein.

Operation 3c: The RN performs RLC layer function processing on the downlink data. The RLC processing herein includes at least one of the following:

1: On the transmit side of the RN, segment the RLC PDU. If the received RLC PDU is an RLC PDU obtained after segmentation, the segmentation herein may be referred to as re-segmentation or second segmentation (2nd segmentation). The re-segmentation or second segmentation herein may be relative to a case in which the DgNB or the previous-hop RN has segmented an RLC PDU or an RLC SDU. The transmit side of the RN segments the received RLC PDU, to be specific, performs segmentation processing on an RLC SDU or an RLC SDU segment that is included in a data field in the received RLC PDU. The RN adds RLC layer header information to obtained new segments, to correspondingly form new RLC PDUs. For example, one RLC PDU may be segmented into at least two segments, and each segment may correspond to a new RLC PDU. In the case of re-segmentation, each obtained new RLC PDU includes a sequence number (SN) in the original RLC PDU, and the sequence number in the original RLC PDU is the same as or has a correspondence with a sequence number of an initial RLC SDU. Optionally, during the processing at the RLC layer of the RN, a re-segmentation operation may not be performed on an RLC state report PDU.

After the transmit side of the RN node performs segmentation processing on the downlink data packet, the obtained RLC PDU meets the foregoing "packet structure 1".

2: The RN node performs the foregoing "modification 1" on the RLC PDU packet.

3: Skip executing a data retransmission mechanism at the RLC layer of the RN. Specifically, the processing includes at least one of the following:

The RN skips retransmitting an RLC PDU in any one of the following cases: a data receiving end does not correctly receive the RLC PDU sent out by the RN; the data receiving end feeds back that the RLC PDU is not correctly received; the data receiving end feeds back that an RLC SDU or an RLC SDU segment corresponding to a data field in the RLC PDU is not correctly received; or whether the data receiving end receives the RLC PDU is not considered.

The RN skips feeding back a receiving state to the data transmit end for the RLC PDU that is not correctly received; and the RN sends a received report about a receiving state of an RLC SDU to the data transmit end, but may not parse content of the report about the receiving state. For example, if the RN learns of, by using a D/C field and/or a CPT field in header information of the RLC PDU, that a type of the RLC PDU is a control PDU, the RN determines that the RLC PDU carries the report about the state, and then sends the control PDU to the data transmit end based on routing information in the information related to the adaptation function. The report about the receiving state may be from the UE or may be from the DgNB. The receiving state herein may be a situation that one or more RLC SDUs are not correctly received.

By implementing this solution, when the RN performs data transmission with a neighboring network node, during the radio link control layer function processing of the RN, the RN does not need to feed back a state to the data transmit end when the RN does not receive expected data, and also does not need to retransmit data that is sent out by the RN but is not correctly received by the receiving end, that is, a retransmission mechanism similar to an ARQ mechanism is not performed, so that data processing and transmission efficiency in the relay node is higher, and a processing time of the data in the relay node is reduced. Therefore, an end-to-end data transmission latency of the communications system is reduced. Because the ARQ mechanism is not configured in the function of the RLC layer of the RN, that is, the RN does not generate the report about the data receiving state, and does not retransmit the downlink RLC PDU based on the report about the data receiving state that is sent by the UE, the RN does not need to configure a retransmit buffer at the RLC layer. This reduces system resource overheads.

Optionally, during the simplified RLC layer function processing in the RN, segments corresponding to received RLC PDUs may not be reassembled and/or reordered. Herein, that the segments are not reassembled may be understood as: After RLC SDUs are segmented, each obtained segment correspondingly forms a new RLC PDU. During processing at the RLC layer of the RN, a plurality of the formed RLC PDUs do not need to be restored to complete RLC SDUs. Herein, that the segments are not reordered may be understood as: During processing at the RLC layer of the RN, the RLC PDUs received by the RN are not sequentially delivered, after being sorted based on sequence numbers of the SDUs to which the RLC PDUs belong, to an upper layer or the transmit side for subsequent processing. Instead, the received RLC PDUs are directly delivered to the transmit side of the RN for subsequent processing. In this way, data processing in the relay node is further simplified, and the end-to-end communication latency is further reduced.

Optionally, an ARQ-based retransmission mechanism may also be introduced into the RLC layer processing performed by the transmit side of the RN on the downlink data packet, to improve data transmission reliability. Introducing an ARQ mechanism into the foregoing simplified RLC layer function, for example, performing a part that is not required to be performed in the foregoing implementation, may increase a processing latency. Therefore, a balance between improving transmission QoS by executing the ARQ mechanism in the RLC function of the RN and reducing the end-to-end communication latency needs to be implemented based on an actual situation. This is not limited in this embodiment of this application.

The RLC layer processing function herein may be deployed on the downlink receive side of the RN node, may be deployed on the downlink transmit side of the RN node, or may be deployed in a common processing module of the RN node.

Operation 3d: The RN performs adaptation function processing on the downlink data.

For example, the adaptation function processing may be introduced to process the downlink data packet that is obtained after being processed by the RLC layer of the RN. For example, on the transmit side of the RN, the foregoing information used for data packet routing and/or the information used for QoS mapping is added to the downlink data packet. The information used for data packet routing and/or the information used for QoS mapping includes at least one or more of the following: the information about the identifier of the UE, the information about the identifier of the DgNB, the information about the identifier of the at least one RN node involved in a relay link, the information about the identifier of the transmission path, the information about the identifier of the QoS flow, the information about the identifier of the PDU session, the information about the identifier of the radio bearer of the UE, and the information about the identifier of the logical channel of the UE. Herein, for implementation of the adaptation function in the RN, refer to the implementation of the adaptation function in 3b.

Operation 3e: The transmit side of the RN performs MAC layer processing and PHY layer. For example, the processing may include processing such as scheduling, multiplexing, and retransmission. The transmit side of the RN sends, to a next-hop RN node, the downlink data that is processed by the MAC layer and the PHY layer.

Optionally, the MAC layer on the receive side of the RN and/or the MAC layer on the transmit side of the RN may reserve the HARQ-based data retransmission mechanism, and perform, in the data transmission process, operations such as feedback and retransmission that are in the HARQ retransmission mechanism, to further ensure data transmission reliability.

It should be noted that, for ease of description, the foregoing operations are numbered in sequence. However, it may be understood that this does not mean that a procedure of the method needs to be performed in the sequence of the numbers, and specific steps that need to be performed need to be determined based on a specific technical problem to be resolved. Numbering the steps in sequence does not mean that each of the steps needs to be performed.

Example 4

With reference to the system 700, receiving of downlink data is described from a perspective of a receiving end of the downlink data. Herein, the receiving end may be a terminal device, for example, UE. A data processing process at the receiving end includes at least one of the following operations:

Operation 4a: The UE performs PHY layer processing and MAC layer processing on downlink data received from an RN. The processing herein may include HARQ mechanism-based error correction processing, demultiplexing processing, and the like that are performed at a MAC layer.

Operation 4b: The UE performs RLC layer processing. After the PHY layer processing and the MAC layer processing are performed on the downlink data, corresponding RLC PDUs are obtained. If data fields in the RLC PDUs include RLC SDU segments, to be specific, if RLC SDUs are segmented by the transmit end DgNB and/or segmented by an intermediate node RN, an RLC layer of the receiving end UE may perform reassembly (e.g., reassemble) processing on the received RLC PDUs based on information carried in the RLC PDUs. Specifically, the UE may remove RLC packet headers by using indication information carried in the received RLC PDU packets, reassemble the RLC SDU segments in the RLC PDU packets, reorder the complete RLC SDUs obtained after the reassembling, and then sequentially deliver complete RLC SDUs to a PDCP layer.

Optionally, before the UE performs the RLC layer processing, the UE performs adaptation function processing, including reading information related to an adaptation function, and/or removing an adaptation layer header if the adaptation function is an independent protocol layer. If the adaptation function is a part of the RLC layer, these operations may be completed in the function of the RLC layer of the UE.

During the RLC layer processing, the UE may execute an ARQ mechanism-based data transmission error correction mechanism, so that an RLC SDU or an RLC SDU segment that is not received can be retransmitted. If some RLC PDUs are lost or not correctly received, and consequently the receiving end UE cannot obtain the complete RLC SDUs corresponding to these RLC PDUs, the receiving end UE sends, by using a relay node, a report about an RLC receiving state, for example, an RLC state report, to indicate, to the transmit end DgNB, an RLC SDU or an RLC SDU segment that is not correctly received, so that the transmit end DgNB performs retransmission.

Operation 4c: The UE performs PDCP layer processing and SDAP layer processing on the downlink data. The PDCP layer processing herein may include at least one of the following: deciphering, integrity verification, reordering and duplicate detection, and header decompression. The SDAP layer processing herein may include processing such as reading information about a QoS flow ID and removing an SDAP header.

With reference to the system 700, the foregoing describes examples of an operating mechanism of the system 700 from perspectives of the donor gNodeB, the relay node, and the terminal device in the downlink data transmission process. The donor gNodeB, a first type of relay node (for example, the RN directly performs communication interaction with the UE), a second type of relay node (for example, the RN performs communication interaction with the UE by using another RN), and the terminal device (and processing procedures related to the donor gNodeB, the first type of relay node, the second type of relay node, and the terminal device) shown in Example 1, Example 2, Example 3, and Example 4 each are a relatively independent implementation method or single network element system, and each are used as a component of the radio relay system 700. In the embodiments related to the system 700, because an implementation of the protocol stack of the relay node RN is greatly simplified compared with that in the prior art, a processing latency of a data packet in the relay node is reduced. This helps improve end-to-end transmission guarantee and efficiency.

It can be learned from the operating mechanism of the system 700, end-to-end transmission of the system operates in the acknowledged mode. For example, the RLC layers of the UE and the DgNB each have the data receiving state feedback mechanism and the retransmission mechanism. However, the data receiving state feedback mechanism and the retransmission mechanism may not be configured at the RLC layer of the RN node. The end-to-end transmission latency of the system is reduced by improving the data processing and transmission efficiency of the intermediate node.

The foregoing mainly describes, from the perspective of downlink data transmission and processing, functions of the network nodes in the radio relay communications system and the operating mechanism of the radio relay communications system. It may be understood that, in the wireless communications system, a direction in which data is transmitted from the terminal device to the network side is uplink, and a direction in which data is transmitted from the network side to the terminal device is downlink. For ease of understanding and description, uplink transmission and downlink transmission of the relay communications system are separately described in this specification. The following describes the radio relay communications system in this application and its operating mechanism from a perspective of uplink data transmission and processing.

Figure 8:
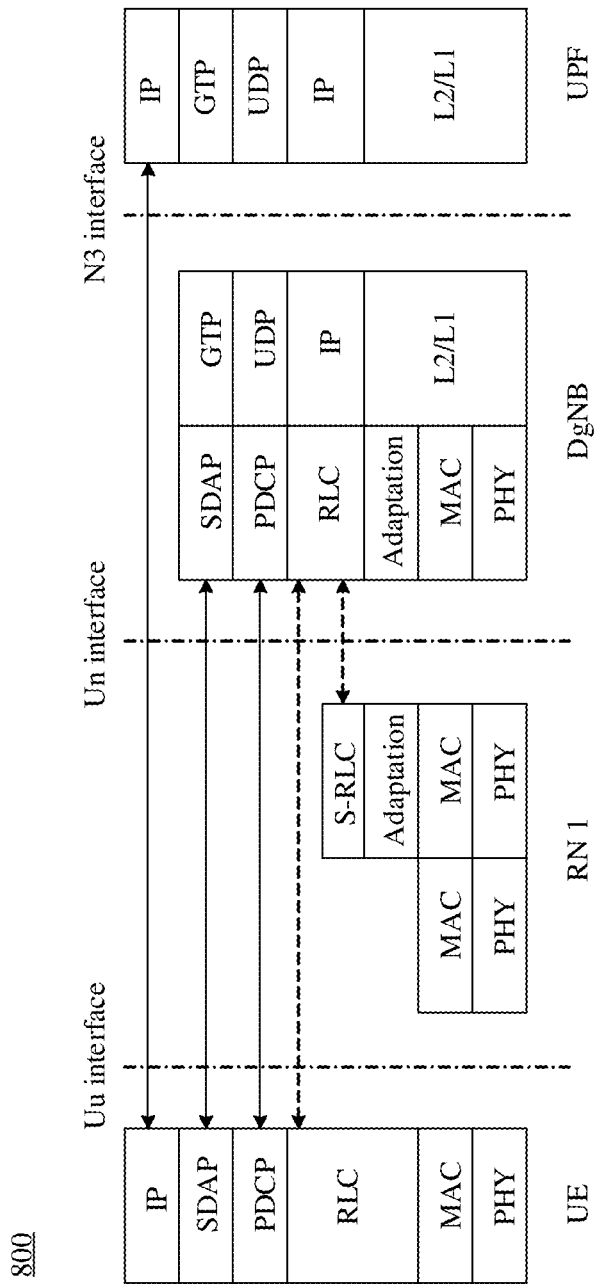
FIG. 8 is a schematic diagram of a radio relay communications system 800 according to an embodiment of this application.

With reference to the implementation of any one of the foregoing systems 300 to 700, FIG. 8 shows a radio relay communications system 800 according to an embodiment of this application. The system 800 is described by using uplink data transmission and a user plane protocol stack as an example, and includes UE, an RN 1, a DgNB, and a UPF. The UE performs communication interaction with the RN 1 through a communications interface between the UE and the RN 1 (for example, the interface is a Uu interface, but a name is not limited herein). The RN 1 performs communication interaction with the DgNB through a communications interface between the RN 1 and the DgNB (for example, the interface is a Un interface, and a name is not limited herein). The DgNB performs communication interaction with the UPF through a communications interface between the DgNB and the UPF (for example, the interface is an N3 interface, and a name is not limited herein). Logically, the UE may also perform communication interaction with the DgNB by using peer-to-peer communications protocols. For example, the UE performs communication interaction with the DgNB by using peer-to-peer RLC protocol layers, PDCP protocol layers, and SDAP protocol layers that are included in the UE and the DgNB. Logically, the UE may also perform communication interaction with the UPF by using peer-to-peer IP protocol layers that are included in the UE and the UPF. The system 800 may be applied to a wireless single-hop relay scenario, that is, there is only one RN between the UE and the DgNB in the relay communications system. A protocol stack configured on the UE includes a PHY layer, a MAC layer, an RLC layer, a PDCP layer, an SDAP layer, and an IP layer. A protocol stack configured on an uplink receive side of the RN 1 is at least one of the following: a PHY layer and a MAC layer. A protocol stack configured on an uplink transmit side of the RN 1 is at least one of the following: a PHY layer, a MAC layer, an adaptation layer, and an S-RLC layer. A protocol stack configured on an uplink receive side of the DgNB is at least one of the following: a PHY layer, a MAC layer, an adaptation function, an RLC layer, a PDCP layer, and an SDAP layer. A protocol stack configured on an uplink transmit side of the DgNB includes L1 and L2, an IP layer, a UDP layer, and a GTP layer. Correspondingly, a protocol stack configured on the UPF side includes L1 and L2, an IP layer, a UDP layer, a GTP layer, and an IP layer. Herein, L1 and L2 are usually protocol layers of wired communication. For example, L1 may be a physical layer, L2 may be a data link layer, and L2 may further include at least one of a MAC layer, a logical link control layer (LLC), a point to point protocol (PPP) layer, and a link layer of an Ethernet technology. Specific protocol layers included in L1 and L2 are not limited in this embodiment of this application.

Figure 9:
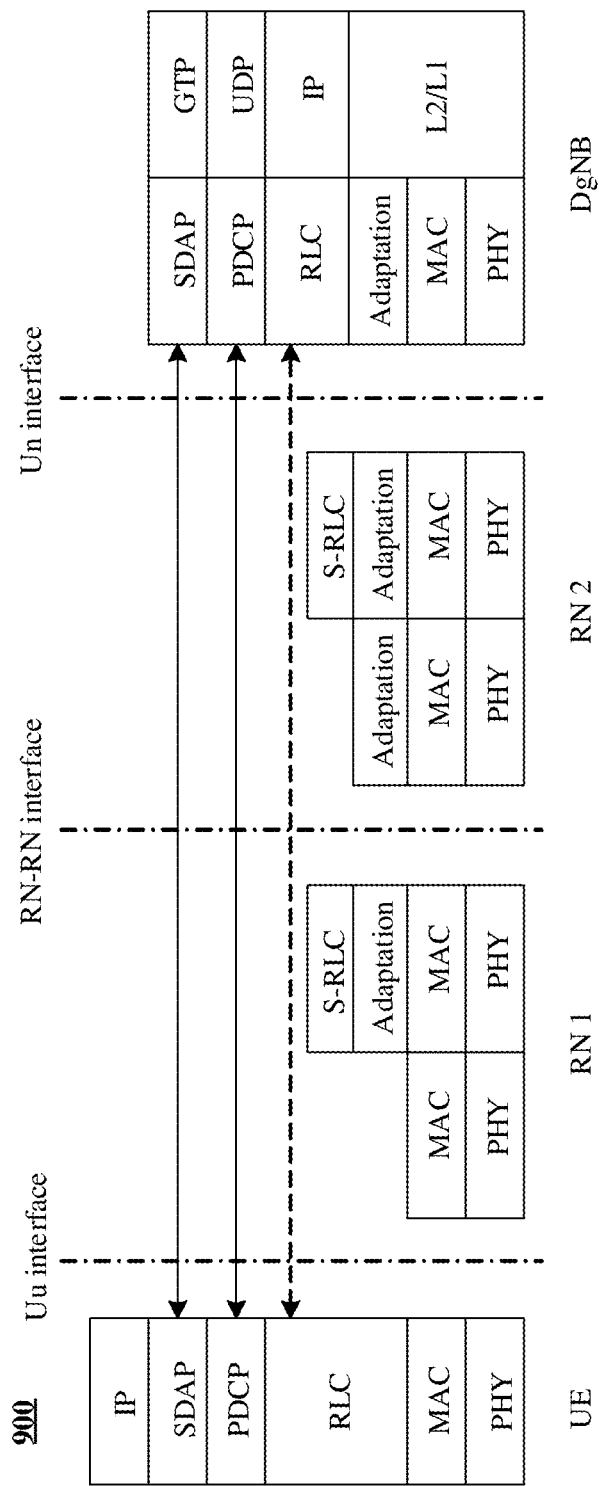
FIG. 9 is a schematic diagram of a radio relay communications system 900 according to an embodiment of this application.

With reference to the radio relay communications system 800 shown in FIG. 8, FIG. 9 shows a radio relay communications system 900 for a scenario in which there are a plurality of RNs between the UE and the DgNB. The system 900 includes UE, an RN 1, an RN 2, and a DgNB. The UE performs communication interaction with the RN 1 through an interface between the UE and the RN 1 (where, for example, the interface is a Uu interface, but a name is not limited herein). The RN 1 performs communication interaction with the RN 2 through an interface between the RN 1 and the RN 2. The RN 2 performs communication interaction with the DgNB through an interface between the RN 2 and the DgNB. An "RN-RN interface" shown in FIG. 9 indicates that the communications interface is a communications interface between two relay nodes. Logically, the UE may also perform communication interaction with the DgNB by using peer-to-peer protocol stacks. For example, the UE performs communication interaction with the DgNB by using peer-to-peer RLC protocol layers, peer-to-peer PDCP protocol layers, and peer-to-peer SDAP protocol layers that are included in the UE and the DgNB. In the system 900, a protocol stack configured on the UE includes a PHY layer, a MAC layer, an RLC layer, a PDCP layer, an SDAP layer, and an IP layer. A protocol stack configured on an uplink receive side of the relay node RN 1 is at least one of the following: PHY and MAC. A protocol stack configured on an uplink transmit side of the relay node RN 1 is at least one of the following: a PHY layer, a MAC layer, an adaptation function, and an S-RLC layer. A protocol stack configured on an uplink receive side of the relay node RN 2 is at least one of the following: PHY, MAC, and an adaptation function. A protocol stack configured on an uplink transmit side of the relay node RN 2 is at least one of the following: a PHY layer, a MAC layer, an adaptation function, and an S-RLC layer. A protocol stack configured on an uplink receive side of the DgNB includes: a PHY layer, a MAC layer, an adaptation function, an RLC layer, a PDCP layer, and an SDAP layer. A protocol stack configured on an uplink transmit side of the DgNB includes L1 and L2, an IP layer, a UDP layer, and a GTP layer. Herein, L1 and L2 are usually protocol layers of wired communication. For example, L1 may be a physical layer, L2 may be a data link layer, and L2 may further include at least one of a MAC layer, a logical link control layer (LLC), a point to point protocol (PPP) layer, and a link layer of an Ethernet technology. Specific protocol layers included in L1 and L2 are not limited in this embodiment of this application.

It can be learned from the protocol stack architectures of the systems shown in FIG. 8 and FIG. 9 that, for the relay node RN 1, for example, a protocol stack configuration of the RN 1 on the uplink receive side is the PHY layer and the MAC layer, and a protocol stack configuration of the RN 1 on the uplink transmit side is PHY, MAC, the adaptation function, and the S-RLC layer. For the relay node RN 2, for example, a protocol stack configuration of the RN 2 on the uplink receive side is PHY, MAC, and the adaptation function, and a protocol stack configuration on the uplink transmit side is PHY, MAC, the adaptation function, and the S-RLC layer. Compared with the prior art, in the embodiments of this application, the protocol stack configurations of the RN 1 and the RN 2 and data processing in the RN 1 and the RN 2 are simplified, so that a processing time of uplink data in the relay node is reduced. Therefore, an end-to-end data transmission latency in the communications system is reduced.

Figure 10:
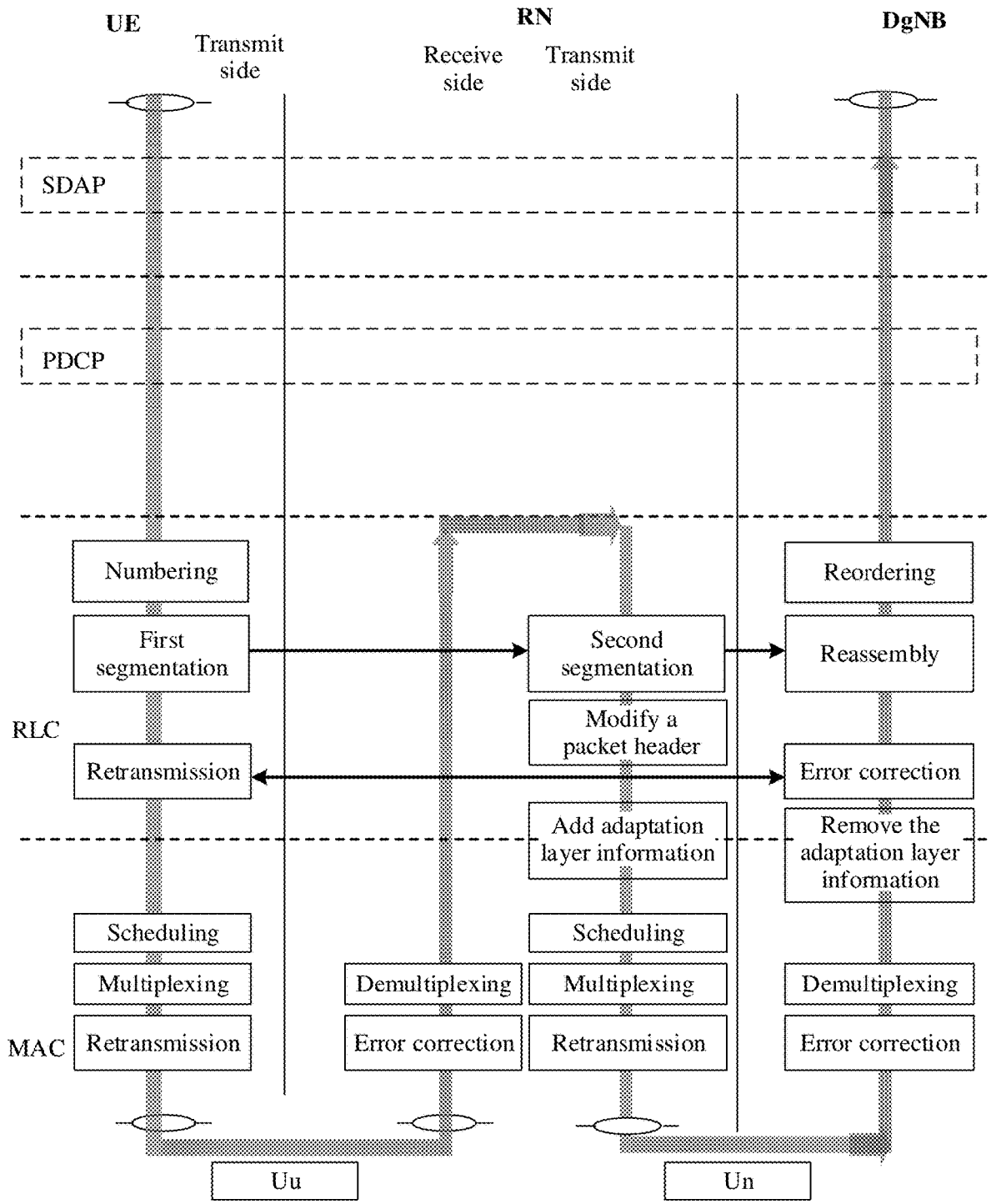
FIG. 10 is a schematic diagram of a radio relay communications system 1000 according to an embodiment of this application.

With reference to the implementation of the system 800 and/or the system 900, FIG. 10 shows a radio relay communications system 1000 according to an embodiment of this application. The system 1000 includes a transmit end, a relay node, and a receiving end in a radio access network. Specifically, the transmit end may be UE, the relay node may be an RN, and the receiving end may be a DgNB in a radio access system. The UE performs communication interaction with the RN through a communications interface between the UE and the RN (where, for example, the interface is a Uu interface, and a name is not limited herein). The RN performs communication interaction with the DgNB through an interface between the RN and the DgNB (where, for example, the interface may be a Un interface, and a name is not limited herein). The following describes composition and operation of the system 1000 from a perspective of functions of the nodes in the relay communications system and an uplink data processing procedure. The system 1000 may operate according to mechanisms in the following examples.

Example 5

This embodiment is described by using an example in which the uplink transmit end is the UE. Processing, in the UE, on a user plane data packet generated by the UE includes at least one of the following operations:

Operation 5a: SDAP layer function processing performed in the UE. Optionally, for the SDAP layer function processing herein, refer to the prior art.

Operation 5b: PDCP layer function processing performed in the UE. Optionally, for the PDCP layer function processing herein, refer to the prior art.

Operation 5c: RLC layer function processing performed in the UE. The RLC layer function processing herein includes at least one of the following:

(1) Number (e.g., sequence numbering) RLC SDUs, so that each RLC SDU has its sequence number at the RLC layer.

(2) Perform the first data packet segmentation (1st segmentation) on the RLC SDUs at the RLC layer. For example, one RLC SDU may be segmented into at least two segments, each obtained segment may correspond to a new RLC PDU, and a sequence number of each RLC PDU obtained after the segmentation is the same as a sequence number of the segmented original RLC SDU, or there is a correspondence between a sequence number of each RLC PDU obtained after the segmentation and a sequence number of the segmented original RLC SDU. In some cases, for example, when air interface resources are relatively sufficient, the RLC SDU may not be segmented, and a correspondingly transmitted RLC PDU carries the complete RLC SDU. Whether to perform segmentation is specifically determined based on an actual situation. This is not limited herein.

(3) Retransmit a data packet. The retransmission herein may be performed based on an automatic retransmission request mechanism, and the retransmitted data packet may be an RLC SDU or an RLC SDU segment. In some cases, for example, when the air interface resources are relatively sufficient, the RLC SDU is not segmented. In this case, the uplink-transmitted data packet is the RLC SDU, and the retransmitted data packet is also the corresponding RLC SDU. For another example, when MAC layer resources are relatively fewer, an RLC SDU that needs to be retransmitted need to be segmented and then retransmitted. Alternatively, when an RLC state report fed back by the receiving end indicates that some segments of some RLC SDUs are not correctly received, the segments that are not correctly received may be retransmitted. Whether the specific retransmitted data packet is the RLC SDU or the RLC PDU obtained after the RLC SDU is segmented needs to be determined based on an actual situation. This is not limited herein.

For example, an RLC layer data retransmission mechanism executed between the terminal device and the donor gNodeB includes: if the UE receives an RLC state report (for example, a report, from the DgNB, about a receiving state of the RLC SDU) from the DgNB, resending, by the UE to the DgNB by using at least one RN, an RLC SDU (or an RLC SDU segment) that is not correctly sent to the DgNB, where in the process in which the UE resends the RLC SDU to the DgNB, the at least one RN may not identify whether the RLC SDU is an initially transmitted RLC SDU or a retransmitted RLC SDU; and/or sending, by the UE, a report about a receiving state of an RLC SDU to the DgNB by using the at least one RN. For example, if the UE determines that one or more RLC SDUs from the DgNB are not received or not correctly received, the UE sends, to the DgNB, a report about a receiving state of a data packet that is not received. In a process of sending the report about the receiving state to the DgNB, the RN may not parse content of the report about the state. The RN may learn, by using a D/C field and/or a CPT field in header information of an RLC PDU, that a type of the RLC PDU is a control PDU. In this way, the RN determines that the RLC PDU carries an RLC state report, and then, sends the control PDU to the DgNB based on routing information in information related to an adaptation function. The information related to the adaptation function may also be carried in the RLC PDU. By implementing this solution, the data retransmission mechanism is executed between the UE and the DgNB. This better ensures end-to-end communication transmission quality of the relay communications system.

In an optional implementation, the RLC PDU obtained after the RLC layer function processing in the UE meets the following "packet structure 1".

Operation 5d: MAC layer function processing and PHY layer function processing performed in the UE. The processing at the MAC layer herein includes at least one of the following: scheduling (e.g., scheduling or priority handling) processing, multiplexing processing, and HARQ mechanism-based retransmission processing. After the MAC layer function processing, the uplink data is processed at a PHY layer, and then is sent to the RN by using the communications interface between the UE and the RN.

It should be noted that, for ease of description, the foregoing operations are numbered in sequence. However, it may be understood that this does not mean that a procedure of the method needs to be performed in the sequence of the numbers, and specific steps that need to be performed need to be determined based on a specific technical problem to be resolved. Numbering the steps in sequence does not mean that each of the steps needs to be performed.

According to the system 1000, the following describes an example of the present invention from a perspective of the RN. Processing, in the RN, on the uplink data sent by the UE may include two cases. In a first case, the RN that processes the uplink data performs direct communication interaction with the UE, and this case is applicable to a single-hop relay scenario or a multi-hop relay scenario. In a second case, the RN that processes the uplink data needs to perform communication interaction with the UE by using another RN, and this case is applicable to a multi-hop relay scenario.

Example 6

In the first case, the processing on the uplink data in the RN includes at least one of the following operations.

Operation 6a: An uplink receive side of the RN performs PHY layer function processing and MAC layer function processing on the received uplink data. Herein, the processing at a MAC layer includes at least one of the following: performing error correction by using a HARQ mechanism, and demultiplexing on a receiving of the uplink data.

Operation 6b: The RN performs at least one of the following processing related to an adaptation function on the uplink data.

1: The RN determines a radio bearer or a logical channel required for sending the uplink data packet. Optionally, a radio bearer or a logical channel used for sending the uplink data through an interface between the RN and a next-hop node (for example, another RN or the DgNB) is determined based on a QoS parameter and/or a QoS mapping rule configured by a network side (for example, configured by a core network element or the DgNB for the RN, or locally configured by the RN), and/or a logical channel or a radio bearer, of the RN, corresponding to the received uplink data. Alternatively, optionally, a radio bearer or a logical channel used for sending the uplink data through an interface between the RN and a next-hop node (for example, another RN or the DgNB) is determined based on a QoS parameter and/or a QoS mapping rule configured by a network side (for example, configured by a core network element or the DgNB for the RN, or locally configured by the RN), and/or an identifier of a QoS flow that is carried in the received uplink data packet. Alternatively, optionally, a radio bearer or a logical channel used for sending the uplink data through an interface between the RN and a next-hop node (for example, another RN or the DgNB) is determined by the RN based on information about an identifier of a radio bearer of the UE or information about an identifier of a logical channel of the UE that is carried in the data packet.

2: The RN determines a node to which the uplink data packet needs to be sent. Specifically, the RN may select the next-hop node based on a configured routing policy. For example, the next-hop node may be the DgNB or another RN. The routing policy may be configured by the network side, for example, the DgNB, or may be locally configured by the RN.

Operation 6c: The RN performs RLC layer processing on the uplink data. The RLC processing herein includes at least one of the following:

1: Segment an RLC PDU. For example, if the RLC PDU received by the RN is an RLC PDU obtained after segmentation, the segmentation herein may be referred to as re-segmentation or second segmentation. The re-segmentation or second segmentation herein may be relative to a case in which the UE has performed segmentation. The RN segments the RLC PDU, to be specific, performs segmentation processing on an RLC SDU or an RLC SDU segment that is included in a data field in the received RLC PDU. The RN adds RLC layer header information to obtained segments, to correspondingly form new RLC PDUs. For example, one RLC PDU may be segmented into at least two segments, and each segment may correspond to a new RLC PDU. In the case of re-segmentation, each obtained new RLC PDU includes a sequence number (SN) in the original RLC PDU, and the sequence number in the original RLC PDU is the same as or has a correspondence with a sequence number of an initial RLC SDU. Optionally, during the processing at the RLC layer of the RN, a re-segmentation operation may not be performed on an RLC state report PDU.

After the transmit side of the RN node performs segmentation processing on the uplink data packet, the obtained RLC PDU meets the foregoing "packet structure 1".

2: The RN node performs the foregoing "modification 1" on the RLC PDU packet.

3: Skip executing a data retransmission mechanism at the RLC layer of the RN. Specifically, the processing includes at least one of the following:

The RN skips retransmitting an RLC PDU in any one of the following cases: a data receiving end does not correctly receive the RLC PDU sent out by the RN; the data receiving end feeds back that the RLC PDU is not correctly received; the data receiving end feeds back that an RLC SDU or an RLC SDU segment corresponding to a data field in the RLC PDU is not correctly received; or whether the data receiving end receives the RLC PDU is not considered.

The RN skips feeding back a receiving state to the data transmit end for the RLC PDU that is not correctly received; and the RN sends a received report about a receiving state of an uplink RLC SDU to the data transmit end, but may not parse content of the report about the receiving state. For example, if the RN learns of, by using a D/C field and/or a CPT field in header information of the RLC PDU, that a type of the RLC PDU is a control PDU, the RN determines that the RLC PDU carries the report about the state, and then sends the control PDU to the data transmit end based on routing information. The report about the receiving state may be from the UE or may be from the DgNB. The receiving state herein may be a situation that one or more RLC SDUs are not correctly received.

By implementing this solution, when the RN performs data transmission with a neighboring network node, during the radio link control layer function processing of the RN, the RN does not need to feed back a state to the data transmit end when the RN does not receive expected data, and also does not need to retransmit data that is sent out by the RN but is not correctly received by the receiving end, so that data processing and transmission efficiency in the RN is higher, and a processing time of the data in the relay node is reduced. Therefore, an end-to-end data transmission latency of the communications system is reduced. Because the function of the RLC layer of the RN does not generate the report about the data receiving state, and does not retransmit the RLC PDU based on the report about the data receiving state, the RN does not need to configure a retransmit buffer at the RLC layer. This reduces system resource overheads.

Optionally, during the RLC layer function processing in the RN, segments corresponding to received RLC PDUs may not be reassembled and/or reordered. Herein, that the segments are not reassembled may be understood as: After RLC SDUs are segmented, each obtained segment correspondingly forms a new RLC PDU. During processing at the RLC layer of the RN, a plurality of the formed RLC PDUs do not need to be restored to the complete RLC SDUs. That the segments are not reordered may be understood as: During processing at the RLC layer of the RN, the RLC PDUs received by the RN are not sequentially delivered, after being sorted based on sequence numbers of the SDUs to which the RLC PDUs belong, to an upper layer or the transmit side for subsequent processing. Instead, the received RLC PDUs are directly delivered to the transmit side of the RN for subsequent processing. In this way, data processing in the relay node is further simplified. Therefore, the end-to-end communication latency is further reduced.

Optionally, an ARQ-based retransmission mechanism may also be introduced into the RLC layer processing performed by the transmit side of the RN on the uplink data packet, to improve data transmission reliability. For example, performing a part that is not required to be performed in an RLC function entity of the RN in the foregoing implementation may increase a processing latency. Therefore, a balance between improving transmission QoS by executing the ARQ mechanism in the RLC function of the RN and reducing the end-to-end communication latency needs to be implemented based on an actual situation.

The RLC layer processing function herein may be deployed on the uplink receive side of the RN node, may be deployed on the uplink transmit side of the RN node, or may be deployed in a common processing module of the RN node.

Further, optionally, an adaptation function may be introduced to process the uplink data packet that has been processed by the RLC layer of the RN. For example, on the uplink transmit side of the RN, information used for data packet routing and/or information used for QoS mapping is added to the uplink data packet. The information used for data packet routing and/or the information used for QoS mapping includes at least one of the following: information about an identifier of the UE, information about an identifier of the RN node that provides a service to the UE in a relay transmission link, information about an identifier of the DgNB that provides a service to the UE, information about an identifier of a transmission path, information about an identifier of a QoS flow, information about an identifier of a PDU session, the information about the identifier of the radio bearer of the UE, and the information about the identifier of the logical channel of the UE. For example, the information used for data packet routing and/or the information used for QoS mapping may be included in the header information of the RLC PDU. For example, the information is indicated by using a newly added bit in the header information of the RLC PDU, or the information is indicated by using a reserved bit in the header information of the RLC PDU. Herein, for an implementation of the adaptation function in the RN, refer to the implementation of the adaptation function in 3b. Herein, the RN that provides a service to the terminal device may be an RN that serves a serving cell accessed by the terminal device.

Operation 6d: The transmit side of the RN performs MAC layer processing and PHY layer processing on the uplink data.

The uplink data packet is sent to a next-hop node after being processed by the MAC layer and the PHY layer on the uplink transmit side of the RN. Specifically, in the single-hop relay scenario, the next-hop node herein is the DgNB. In the multi-hop relay scenario, the next-hop node is another RN.

Optionally, the MAC layer on the receive side of the RN and/or the MAC layer on the transmit side of the RN may reserve the HARQ-based data retransmission mechanism, and perform, in the data transmission process, operations such as feedback and retransmission that are in the HARQ retransmission mechanism, to further ensure data transmission reliability.

It should be noted that, for ease of description, the foregoing operations are numbered in sequence. However, it may be understood that this does not mean that a procedure of the method needs to be performed in the sequence of the numbers, and specific steps that need to be performed need to be determined based on a specific technical problem to be resolved. Numbering the steps in sequence does not mean that each of the steps needs to be performed.

Example 7

In the second case, the RN node receives uplink data from another RN (not shown in the system 1000), processes the uplink data, and then sends processed uplink data to a next relay node or the donor gNodeB. A process in which the RN (for example, for a protocol stack configuration of the RN, refer to the RN 2 in the system 900 shown in FIG. 9) processes the uplink data includes at least one of the following operations.

Operation 7a: A receive side of the RN performs PHY layer processing and MAC layer processing on the received uplink data. Herein, the MAC layer processing includes: performing error correction by using a HARQ mechanism, demultiplexing, and the like on receiving of the uplink data.

Operation 7b: The RN performs adaptation layer processing on the uplink data. The adaptation layer processing herein includes at least one of the following:

(1) The RN learns of, from the received uplink data packet, information related to an adaptation function, for example, information used for data packet routing and/or information used for QoS mapping. The information used for data packet routing and/or the information used for QoS mapping includes at least one of the following: information about an identifier of the UE, information about an identifier of an RN that provides a service to the UE, information about an identifier of a transmission path, information about an identifier of the DgNB, information about an identifier of a QoS flow, information about an identifier of a PDU session, information about an identifier of a radio bearer of the UE, and information about an identifier of a logical channel of the UE. Herein, the RN that provides a service to the terminal device may be an RN that serves a serving cell accessed by the terminal device. The information is added to the uplink data packet, to help an intermediate node in the transmission path obtain a correct next-hop node for the uplink data that needs to be transmitted.

(2) Determine a next hop route. For example, the RN may learn, based on the information about the identifier of the UE, the information about the identifier of the RN that provides a service to the UE, the information about the identifier of the DgNB, or the information about the identifier of the transmission path that is carried in the data packet, that the next-hop node to which the data packet is to be transmitted is another RN or the DgNB. The routing policy herein may be configured by the DgNB or a core network element on the network side, or may be locally configured by the RN.

(3) The RN determines a radio bearer or a logical channel required for sending the uplink data packet. Optionally, a radio bearer or a logical channel used for sending the uplink data through an interface between the RN and the next-hop node (for example, another RN or the DgNB) is determined based on a QoS parameter and/or a QoS mapping rule configured by the network side (for example, configured by the core network element or the DgNB for the RN, or locally configured by the RN), and/or a logical channel or a radio bearer, of the RN, corresponding to the received uplink data. Alternatively, optionally, a radio bearer or a logical channel used for sending the uplink data through an interface between the RN and the next-hop node (for example, another RN or the DgNB) is determined based on a QoS parameter and/or a QoS mapping rule configured by the network side (for example, configured by the core network element or the DgNB for the RN, or locally configured by the RN), and/or an identifier of a QoS flow that is carried in the received uplink data packet. Alternatively, a radio bearer or a logical channel used for sending the uplink data through an interface between the RN and the next-hop node (for example, another RN or the DgNB) is determined by the RN based on information about an identifier of a radio bearer of the UE or information about an identifier of a logical channel of the UE that is carried in the data packet. It may be understood that, usually, there is a correspondence between the logical channel of the terminal device and the radio bearer of the terminal device, and the radio bearer usually has a QoS requirement guarantee of a corresponding granularity. In this case, when the uplink data carries the information about the identifier of the logical channel of the UE or the information about the identifier of the radio bearer corresponding to the logical channel, a QoS requirement corresponding to a service to which the uplink data belongs is also indicated. Different PDU sessions usually correspond to different radio bearers. At least one radio bearer may be correspondingly established on an air interface for one PDU session. One PDU session may further carry different QoS flows, and each QoS flow may have a different QoS requirement. In this way, the protocol data unit session may have a corresponding QoS requirement based on the radio bearer corresponding to the protocol data unit session or the QoS flows carried in the protocol data unit session. Certainly, if the uplink data carries the information about the identifier of the QoS flow, the QoS requirement of the service to which the uplink data belongs is also indicated.

(4) Remove the information related to the adaptation function from the uplink data packet, for example, remove an adaptation information packet header.

Herein, the adaptation function processing (for example, identification, deletion, or addition of the information related to the adaptation function) in the RN may be implemented on an uplink receive side on the RN side. For example, the adaptation function processing may be implemented as an independent function module (for example, a logical function protocol layer) that is disposed above a MAC layer on the uplink receive side of the RN; or may be used as a part of a function of an existing protocol layer on the uplink receive side of the RN, for example, a part of a MAC layer function entity on the uplink receive side. In this case, because a function of the MAC layer includes the foregoing adaptation layer function, the function of the MAC layer is different from a function of a conventional MAC layer. If an RLC layer is configured on the uplink receive side of the RN, the adaptation function may alternatively be used as a part of a logical function of the RLC layer on the uplink receive side. The adaptation function processing may alternatively be implemented on an uplink transmit side on the RN side. For example, the adaptation function processing may be implemented as an independent function module (for example, a logical function protocol layer) on the uplink transmit side of the RN; or may be used as a part of a function of an existing protocol layer on the uplink transmit side of the RN, for example, a part of an RLC function entity on the uplink transmit side of the RN.

The related processing function related to the adaptation function may alternatively be separately deployed. For example, a part of the adaptation function is deployed as an independent function entity, a part of the adaptation function is used as a part of the function of the RLC protocol layer, or another part of the adaptation function may be used as a part of the function of the MAC layer. For example, routing information processing involved in the adaptation function processing may be used as an independent part deployed in any one of the foregoing manners, or QoS information processing involved in the adaptation function processing may be used as an independent part deployed in any one of the foregoing manners. Specific division to and deployment of sub-functions in the adaptation function are not limited herein.

It may be understood that, for the adaptation function processing (for example, identification, deletion, or addition of the information related to the adaptation function), if the adaptation function is implemented by adding an independent protocol layer, the protocol layer may be correspondingly referred to as an adaptation layer protocol, but a specific name is not limited herein.

If the adaptation function is implemented in the function of the RLC layer in the RN node, optionally, the information used for data packet routing and/or the information used for QoS mapping may be included in header information of an RLC PDU. For example, the information is indicated by using a newly added bit in the header information of the RLC PDU, or the information is indicated by using a reserved bit in the header information of the RLC PDU.

If the adaptation function is implemented in the function of the MAC layer in the RN node, optionally, the information used for data packet routing and/or the information used for QoS mapping may be included in header information of a MAC SDU. Optionally, the adaptation processing function may alternatively be implemented in a common processing module in the RN, to support implementation of functions of the receive side and the transmit side of the RN.

In conclusion, an implementation of the adaptation function in the RN is not specifically limited herein.

Operation 7c: The RN performs RLC layer processing on the uplink data. The RLC processing herein includes at least one of the following:

1: Segment an RLC PDU. For example, if the RLC PDU received by the transmit side of the RN is an RLC PDU obtained after segmentation, the segmentation herein may be referred to as re-segmentation or second segmentation. The RN segments the received RLC PDU, to be specific, performs segmentation processing on an RLC SDU or an RLC SDU segment that is included in a data field in the received RLC PDU. The RN adds RLC layer header information to obtained new segments, to correspondingly form new RLC PDUs. For example, one RLC PDU may be segmented into at least two segments, and each segment may correspond to a new RLC PDU. In the case of re-segmentation, each obtained new RLC PDU includes a sequence number (SN) in the original RLC PDU, and the sequence number in the original RLC PDU is the same as or has a correspondence with a sequence number of an initial RLC SDU. After the transmit side of the RN node performs segmentation processing on the uplink data packet, the obtained RLC PDU meets the foregoing "packet structure 1". Optionally, during the processing at the RLC layer of the RN, a re-segmentation operation may not be performed on an RLC state report PDU.

2: The RN node performs the foregoing "modification 1" on the RLC PDU packet.

3: Skip executing a data retransmission mechanism at the RLC layer of the RN. Specifically, the processing includes at least one of the following:

The RN skips retransmitting an RLC PDU in any one of the following cases: a data receiving end does not correctly receive the RLC PDU sent out by the RN; the data receiving end feeds back that the RLC PDU is not correctly received; the data receiving end feeds back that an RLC SDU or an RLC SDU segment corresponding to a data field in the RLC PDU is not correctly received; or whether the data receiving end receives the RLC PDU is not considered.

The RN skips feeding back a receiving state to the data transmit end (for example, the UE) for the RLC PDU that is not correctly received; and the RN sends a received report about a receiving state of an uplink RLC SDU to the data transmit end, but may not parse content of the report about the receiving state. For example, if the RN learns of, by using a D/C field and/or a CPT field in header information of the RLC PDU, that a type of the RLC PDU is a control PDU, the RN determines that the RLC PDU carries the report about the state, and then sends the control PDU to the data transmit end the based on routing information. The report about the receiving state may be from the UE or may be from the DgNB. The receiving state herein may be a situation that one or more RLC SDUs are not correctly received.

By implementing this solution, data processing in the RN is simplified, a processing time of the data in the relay node is reduced. Therefore, an end-to-end data transmission latency of the communications system is reduced. Because a function of the RLC layer of the RN does not generate the report about the data receiving state, and does not retransmit the uplink RLC PDU based on the report about the data receiving state, the RN does not need to configure a retransmit buffer (retransmit buffer) at the RLC layer. This reduces system resource overheads.

Optionally, during the RLC layer function processing in the RN, segments corresponding to received RLC PDUs may not be reassembled and/or reordered. Herein, that the segments are not reassembled may be understood as: After RLC SDUs are segmented, each obtained segment correspondingly forms a new RLC PDU. During processing at the RLC layer of the RN, a plurality of the formed RLC PDUs do not need to be restored to the complete RLC SDUs. That the segments are not reordered may be understood as: During processing at the RLC layer of the RN, the RLC PDUs received by the RN are not sequentially delivered, after being sorted based on sequence numbers of the SDUs to which the RLC PDUs belong, to an upper layer or the transmit side for subsequent processing. Instead, the received RLC PDUs are directly delivered to the transmit side of the RN for subsequent processing. In this way, data processing in the relay node is further simplified. Therefore, the end-to-end communication latency is further reduced.

Optionally, an ARQ-based retransmission mechanism may also be introduced into the RLC layer processing performed by the transmit side of the RN on the uplink data packet, to improve data transmission reliability. For example, performing a part that is not required to be performed in an RLC function entity of the RN in the foregoing implementation may increase a processing latency. Therefore, a balance between improving transmission QoS by executing the ARQ mechanism in the RLC function of the RN and reducing the end-to-end communication latency needs to be implemented based on an actual situation. This is not limited in this embodiment of this application.

The RLC layer processing function herein may be deployed on the uplink receive side of the RN node, may be deployed on the uplink transmit side of the RN node, or may be deployed in a common processing module of the RN node.

Operation 7d: The transmit side of the RN performs adaptation layer processing on the uplink data, and the adaptation layer processing herein includes at least one of the following:

Optionally, an adaptation function may be introduced to process the uplink data packet that has been processed by the RLC layer of the RN. For example, on the uplink transmit side of the RN, information used for data packet routing and/or QoS mapping is added to the uplink data packet. The information used for data packet routing and/or the information used for QoS mapping includes at least one of the following: the information about the identifier of the UE, the information about the identifier of the RN node that provides a service to the UE, the information about the identifier of the DgNB that provides a service to the UE, the information about the identifier of the transmission path, the information about the identifier of the QoS flow, the information about the identifier of the PDU session, the information about the identifier of the radio bearer of the UE, and the information about the identifier of the logical channel of the UE. For example, the information used for data packet routing and/or the information used for QoS mapping may be included in the header information of the RLC PDU. For example, the information is indicated by using a newly added bit in the header information of the RLC PDU, or the information is indicated by using the reserved bit in the header information of the RLC PDU. Herein, for an implementation of the adaptation function in the RN, refer to the implementation of the adaptation function in 3b. Herein, the RN that provides a service to the terminal device may be an RN that serves a serving cell accessed by the terminal device.

Operation 7e: The transmit side of the RN performs MAC layer processing and PHY layer processing on the uplink data. For example, the processing may include processing such as scheduling, multiplexing, and retransmission.

The transmit side of the RN sends the uplink data processed by the MAC layer and the PHY layer to a next-hop RN node or the DgNB.

Optionally, the MAC layer on the receive side of the RN and/or the MAC layer on the transmit side of the RN may reserve the HARQ-based data retransmission mechanism, and perform, in the data transmission process, operations such as feedback and retransmission that are in the HARQ retransmission mechanism, to further ensure data transmission reliability.

It should be noted that, for ease of description, the foregoing operations are numbered in sequence. However, it may be understood that this does not mean that a procedure of the method needs to be performed in the sequence of the numbers, and specific steps that need to be performed need to be determined based on a specific technical problem to be resolved. Numbering the steps in sequence does not mean that each of the steps needs to be performed.

Example 8

Based on the system 1000, receiving of uplink data is described from a perspective of an uplink data receiving end. Herein, the receiving end is the donor gNodeB DgNB used as an example. Data processing in the DgNB includes at least one of the following operations:

Operation 8a: The DgNB performs PHY layer processing and MAC layer processing on the received uplink data. Fr example, the processing may include HARQ mechanism-based error correction processing, demultiplexing processing, and the like performed at a MAC layer.

Operation 8b: The DgNB performs RLC layer function processing.

Optionally, before the DgNB performs the RLC layer function processing, the DgNB may perform adaptation function processing, including reading information related to an adaptation function (for example, an identifier of the UE, an identifier of a bearer of the UE, and an identifier of a PDU session), and/or removing an adaptation layer header if the adaptation function is an independent protocol layer. If the adaptation function is configured as a part of a function of the RLC layer, these operations may be completed in a function of the RLC layer of the DgNB.

If data fields in RLC PDUs received by the DgNB include RLC SDU segments, to be specific, if RLC SDUs are segmented by the transmit end UE and/or segmented by an intermediate node RN, the RLC layer of the DgNB may remove RLC PDU headers based on information indication in packet headers of the received RLC PDUs, perform reassembly (reassemble) processing on the received RLC SDU segments based on information carried in the RLC PDU headers, reorder the complete RLC SDUs obtained after the reassembling, and then sequentially deliver complete RLC SDUs to a PDCP layer.

The DgNB may execute an ARQ mechanism-based data transmission error correction mechanism at the RLC layer, so that an RLC SDU or an RLC SDU segment that is not received can be retransmitted. If some RLC PDUs are lost or not correctly received, and consequently the receiving end DgNB cannot obtain the complete RLC SDUs corresponding to these RLC PDUs, the receiving end DgNB sends, by using a relay node, a report about an RLC receiving state, for example, an RLC state report, to indicate, to the transmit end UE, an RLC SDU or an RLC SDU segment that is not correctly received, so that the transmit end UE performs retransmission.

Operation 8c: The receiving end DgNB performs PDCP layer processing and SDAP layer processing on the uplink data.

With reference to the system 1000, the foregoing describes examples of an operating mechanism of the system 1000 from perspectives of the terminal device, the relay node, and the donor gNodeB in the uplink data transmission process. The terminal device, a first type of relay node (for example, the RN directly performs communication interaction with the UE), a second type of relay node (for example, the RN performs communication interaction with the UE by using another RN), and the donor gNodeB (and processing procedures respectively related to the terminal device, the first type of relay node, the second type of relay node, and the donor gNodeB) shown in Example 5, Example 6, Example 7, and Example 8 each are a relatively independent implementation method or single network element system, and each are used as a component of the radio relay system 1000. In the embodiments related to the system 1000, because an implementation of the protocol stack of the relay node is greatly simplified compared with that in the prior art, a processing latency of a data packet in the relay node is reduced. This helps improve end-to-end transmission guarantee and efficiency.

Any one of the enumerated implementations may be understood as a technical solution designed for a specific scenario or a specific technical problem, but may not be understood as necessary for implementing the technical content described in this application. Any one of these implementations may be combined with another implementation for implementation as required, to more pertinently resolve a specific objective technical problem.

Figure 11:
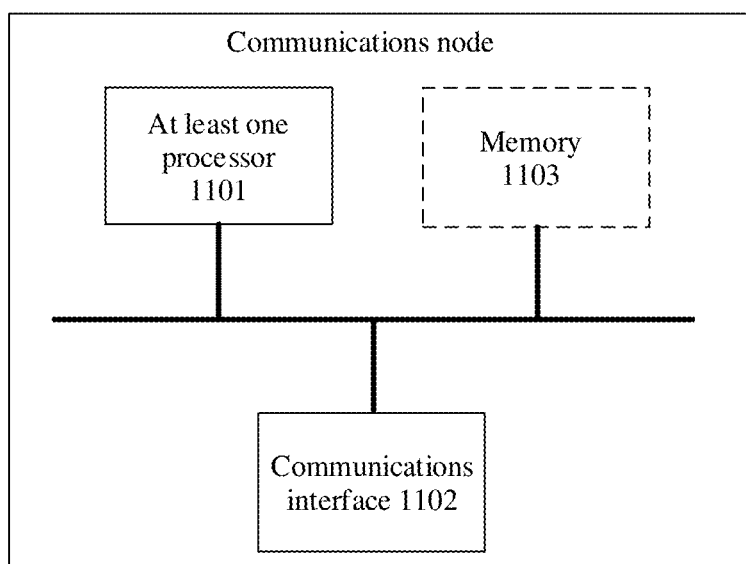
FIG. 11 is a schematic diagram of a communications node 1100 according to an embodiment of this application.

It may be understood that, for the relay node, the donor gNodeB, and the terminal device in the foregoing embodiments, the functions of the relay node, the donor gNodeB, and the terminal device in any technical solution in the foregoing embodiments of this application are separately implemented by using a hardware platform having a processor and a communications interface by executing a program instruction. Based on this, FIG. 11 is schematic block diagram of a communications node 1100 according to an embodiment of this application. The communications node 1100 includes:

at least one processor 1101 and a communications interface 1102. The communications interface 1102 is configured to support the communications node 1100 in performing communication interaction with another device. For example, a control PDU at an RLC layer, a data PDU at the RLC layer, or any type of uplink/downlink-transmitted data/signaling in this application may be exchanged by using the communications interface 1102. When the program instruction is executed in the at least one processor 1101, a function of operating on any one of the following devices in any solution in the foregoing embodiments of this application is implemented: the relay node, the terminal device, and the donor gNodeB. Optionally, the communications node 1100 may further include a memory 1103, to store a program instruction necessary for implementation of the functions of the foregoing devices or data generated during a program execution process. Optionally, the communications node 1100 may further include an internal interconnection line, to implement communication interaction between the at least one processor 1101, the communications interface 1102, and the memory 1103. The at least one processor 1101 may be implemented by using a dedicated processing chip, a processing circuit, a processor, or a general-purpose chip. For example, all or some processing of the PHY function in the embodiments may be implemented by disposing a dedicated circuit/chip in the at least one processor, or certainly, may be implemented by executing a program instruction related to the PHY function by a general-purpose processor disposed in the at least one processor 1101. For another example, for all or some processing of functions related to the MAC layer, the adaptation function, the RLC layer, the PDCP layer, and the SDAP layer in the devices in the embodiments of this application, the at least one processor 1101 may include a general-purpose processing chip, to invoke program instructions of the related functions of the MAC layer, the adaptation function, the RLC layer, the PDCP layer, and the SDAP layer to implement the processing. It may be understood that methods, procedures, or data transmission steps of the implementations described with reference to the embodiments disclosed in this specification can be implemented by electronic hardware or a combination of computer software and electronic hardware. Whether these functions are performed by hardware or software depends on specific application and a design constraint condition of the technical solutions. For example, in terms of good universality, low costs, and decoupling between software and hardware, a program instruction may be executed to implement the functions. For another example, in terms of system performance and reliability, a dedicated circuit may be used to implement the functions. A person of ordinary skill in the art may use different methods to implement the described functions for each particular application. This is not limited herein. It may be understood by a person skilled in the art that, for the purpose of convenient and brief description, for a detailed working process of the foregoing system, apparatus, and unit, refer to a corresponding process in the foregoing method embodiments, and details are not described herein again.

The communications interface 1102 usually has a function of performing information exchange between two communications peer ends. When information exchange in a wired form is performed between the communications peer ends, the communications interface 1102 may be designed as an interface circuit, or a hardware module including the interface circuit, to support communication interaction in a wired form that is performed between the communication peer ends. When information exchange in a wireless form is performed between the communication peer ends, the communications interface 1102 may be an interface circuit having a radio frequency transceiver function, or a hardware system including the interface circuit having the radio frequency transceiver function. For example, when wireless communication is performed between the UE and the RN, or between the RN and the RN, or between the RN and the DgNB, the communications interface may use this implementation.

For the RN, the receive side and the transmit side may be implemented as independent entity hardware for implementation, and each part may have the foregoing hardware architecture: at least one processor 1101 and a communications interface 1102. The at least one processor 1101 may be designed and implemented with reference to the at least one processor 1101, and the communications interface 1102 may be designed and implemented with reference to the communications interface 1102. The receive side and the transmit side may alternatively be implemented by using a chip system. The chip system includes at least one processor. When a program instruction is executed in the at least one processor, a corresponding function of the receive side or the transmit side in the RN in any of the embodiments can be implemented.

An embodiment of this application further provides a computer program product, where the computer program product has a program instruction. When the program instruction is directly or indirectly executed, for example, executed in the communications node 1100 in the foregoing embodiment, a function of any one of the following devices in any of the embodiments of this application is implemented: the relay node, the donor gNodeB, and the terminal device. It may be understood that the program instruction may be stored in a computer-readable storage medium or may be transmitted from one computer-readable storage medium to another computer-readable storage medium. For example, the program instruction may be transmitted from one website, computer, server, or data center to another website, computer, server, or data center in a wired (for example, a coaxial cable, an optical fiber, or a digital subscriber line) or wireless (for example, infrared, radio, or microwave) manner. When the program instruction is executed, considering that a specific network device generally includes a hardware layer, an operating system layer running on the hardware layer, and/or an intermediate layer, when a program instruction related to this embodiment of this application is executed, the program instruction is usually invoked and executed by a plurality of pieces of software. Therefore, the program instruction in a hardware device (a general purpose processing circuit or a dedicated processing circuit) may be an indirect execution process.

An embodiment of this application further provides a computer program storage medium, and the computer program storage medium stores a program instruction. When the program instruction is directly or indirectly executed, for example, executed in the communications node 1100 in the foregoing embodiment, a function of any one of the following devices in any of the embodiments of this application is implemented: the relay node, the donor gNodeB, and the terminal device. It can be understood that, the technical solutions of this application essentially, or the part contributing to the prior art, or some of the technical solutions may be implemented in a form of a software product. The software product is stored in a storage medium, and includes several instructions for instructing the computer device (which may be a personal computer, a server, or a network device) to perform all or some of the steps of the methods described in the embodiments of this application. The storage medium may be any usable medium accessible by a computer device, or a data storage device, such as a server or a data center, integrating one or more usable media. The usable medium may be a magnetic medium (for example, a floppy disk, a hard disk, or a magnetic tape), an optical medium, or a semiconductor medium (for example, a solid-state drive Solid State Disk, SSD), or the like.

An embodiment of this application further provides a chip system, and the chip system includes at least one processor. When a program instruction is executed in the at least one processor, a function on any one of the following devices in any of the embodiments of this application is implemented: the relay node, the donor gNodeB, and the terminal device.

In addition, function units in the embodiments of this application may be integrated into one processing unit, or each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the prior art, or some of the technical solutions may be implemented in a form of a software product. The software product is stored in a storage medium, and includes several instructions for instructing a computer device (which may be a personal computer, a server, or a network device) to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

In the foregoing specific implementations, the objectives, technical solutions, and benefits of the embodiments of the present invention are further described in detail. It should be understood that the foregoing descriptions are merely specific implementation manners of the embodiments of the present technology, but are not intended to limit the protection scope of the embodiments of present technology. Any modification, equivalent replacement, or improvement made based on technical solutions of the embodiments of the present invention shall fall within the protection scope of the embodiments of the present technology.

What is claimed is:

1. A communication apparatus configured for use as a first network node, the first network node being a first relay node, the communication apparatus comprising:
    a processor; and
    a memory configured to store computer readable instructions that, when executed by the processor, cause the communication apparatus to provide execution comprising:

receiving data from a second network node;
performing first-part processing and second-part processing on the received data; and
sending processed data to a third network node, wherein
the first-part processing includes at least one of: physical layer function processing, media access control layer function processing, and adaptation function processing;
the second-part processing includes at least one of: simplified radio link control layer function processing, adaptation function processing, media access control layer function processing, and physical layer function processing; and
during the simplified radio link control layer function processing, obtained segments corresponding to new radio link control layer protocol data units are not reassembled or reordered.

2. The communication apparatus according to claim 1, wherein
the data from the second network node includes downlink data, the second network node is a second relay node or a donor base station, and the third network node is a terminal device;
the first-part processing and the second-part processing are sequentially performed on the downlink data; and
the first-part processing comprises: the physical layer function processing, the media access control layer function processing, and the adaptation function processing; and the second-part processing comprises: the simplified radio link control layer function processing, the media access control layer function processing, and the physical layer function processing.

3. The communication apparatus according to claim 1, wherein
the data from the second network node includes downlink data, the second network node is a third relay node or a donor base station, the third network node is a fourth relay node, and the downlink data is sent to a terminal device by using the third network node;
the first-part processing and the second-part processing are sequentially performed on the downlink data;
the first-part processing comprises: the physical layer function processing, the media access control layer function processing, and the adaptation function processing; and
the second-part processing comprises: the simplified radio link control layer function processing, the adaptation function processing, the media access control layer function processing, and the physical layer function processing.

4. The communication apparatus according to claim 1, wherein
the downlink data includes at least one of: information about an identifier of the terminal device, information about an identifier of a quality of service flow QoS flow, information about an identifier of a protocol data unit session, information about an identifier of a relay node that serves the terminal device, information about an identifier of a radio bearer of the terminal device, or information about an identifier of a logical channel of the terminal device.

5. The communication apparatus according to claim 3, wherein
the downlink data includes at least one of: information about an identifier of the fourth relay node, information about an identifier of the terminal device, information about an identifier of a quality of service flow QoS flow, information about an identifier of a protocol data unit session, information about an identifier of a relay node that serves the terminal device, information about an identifier of a radio bearer of the terminal device, or information about an identifier of a logical channel of the terminal device.

6. The communication apparatus according to claim 1, wherein
the data from the second network node includes uplink data, the second network node is a terminal device, and the third network node is a fifth relay node or a donor base station;
the first-part processing and the second-part processing are sequentially performed on the uplink data;
the first-part processing comprises: the physical layer function processing and the media access control layer function processing; and
the second-part processing comprises: the simplified radio link control layer function processing, the adaptation function processing, the media access control layer function processing, and the physical layer function processing.

7. The communication apparatus according to claim 1, wherein
the data from the second network node includes uplink data, the second network node is a sixth relay node, and the third network node is a seventh relay node or a donor base station;
the first-part processing and the second-part processing are sequentially performed on the uplink data;
the first-part processing comprises: the physical layer function processing, the media access control layer function processing, and the adaptation function processing; and
the second-part processing comprises: the simplified radio link control layer function processing, the adaptation function processing, the media access control layer function processing, and the physical layer function processing.

8. The communication apparatus according to claim 6, wherein
the uplink data comprises at least one of: information about an identifier of the terminal device, information about an identifier of the fifth relay node, information about an identifier of the donor base station, information about an identifier of a quality of service flow QoS flow, information about an identifier of a protocol data unit session, information about an identifier of a radio bearer of the terminal device, or information about an identifier of a logical channel of the terminal device.

9. The communication apparatus according to claim 7, wherein
the uplink data comprises at least one of: information about an identifier of the terminal device, information about an identifier of the seventh relay node, information about an identifier of the donor base station, information about an identifier of a quality of service flow QoS flow, information about an identifier of a protocol data unit session, information about an identifier of a radio bearer of the terminal device, or information about an identifier of a logical channel of the terminal device.

10. The communication apparatus according to claim 1, wherein during the simplified radio link control layer function processing, segmentation is performed on a received radio link control layer protocol data unit, and the obtained segments correspond to the new radio link control layer protocol data units.

11. The communication apparatus according to claim 1, wherein
wherein during the simplified radio link control layer function processing, at least one or more of the following actions are performed: skipping retransmitting a radio link control layer service data unit that is incorrectly sent out, skipping feeding back a receiving state for a radio link control layer service data unit that is incorrectly received, or sending a received report about a receiving state of a radio link control layer service data unit to a data transmit end.

12. The communication apparatus according to claim 1, wherein a data packet obtained after the adaptation function processing comprises: information related to an adaptation function and a radio link control layer protocol data unit.

13. A communication apparatus configured for use as a donor base station, the communication apparatus comprising: a processor; and
a memory configured to store computer readable instructions that, when executed by the processor, cause the communication apparatus to provide execution comprising:
sending, after performing radio link control layer function processing and adaptation function processing, downlink data to a terminal device by using at least one relay node, wherein the downlink data sent to the terminal device includes at least one of: information about an identifier of the terminal device, information about an identifier of the at least one relay node, information about an identifier of a quality of service flow QoS flow, information about an identifier of a protocol data unit session, information about an identifier of a radio bearer of the terminal device, and information about an identifier of a logical channel of the terminal device,
wherein the radio link control layer function processing comprises: sending a report about a receiving state of a radio link control layer service data unit to the terminal device by using the at least one relay node, wherein the report about the receiving state is not parsed by the at least one relay node.

14. The communication apparatus according to claim 13, wherein the radio link control layer function processing comprises:
sending, to the terminal device by using the at least one relay node, a radio link control layer service data unit that is incorrectly sent to the terminal device.

15. The communication apparatus according to claim 13, wherein a data packet obtained after the adaptation function processing comprises: information related to an adaptation function and a radio link control layer protocol data unit.

16. A communication apparatus configured for use as a terminal device, the communication apparatus comprising: a processor; and
a memory configured to store computer readable instructions that, when executed by the processor, cause the communication apparatus to provide execution comprising:
sending, after performing radio link control layer function processing and adaptation function processing, uplink data to a donor base station by using at least one relay node, wherein the uplink data sent to the donor base station comprises at least one of: information about an identifier of the donor base station, information about an identifier of the terminal device, information about an identifier of the at least one relay node, information about an identifier of a quality of service flow QoS flow, information about an identifier of a protocol data unit session, information about an identifier of a radio bearer of the terminal device, and information about an identifier of a logical channel of the terminal device,
wherein the radio link control layer function processing comprises: sending a report about a receiving state of a radio link control layer service data unit to the donor base station by using the at least one relay node, wherein the report about the receiving state is not parsed by the at least one relay node.

17. The communication apparatus according to claim 16, wherein the radio link control layer function processing comprises:
sending, to the donor base station by using the at least one relay node, a radio link control layer service data unit that is incorrectly sent to the donor base station.

18. The communication apparatus according to claim 16, wherein a data packet obtained after the adaptation function processing comprises: information related to an adaptation function and a radio link control layer protocol data unit.

* * * * *